(12) United States Patent
Suwa et al.

(10) Patent No.: US 8,610,980 B2
(45) Date of Patent: Dec. 17, 2013

(54) TABLE GENERATING APPARATUS, TABLE GENERATING METHOD, IMAGE PROCESSING APPARATUS, AND IMAGE PROCESSING METHOD

(75) Inventors: Tetsuya Suwa, Yokohama (JP); Yusuke Hashii, Kawasaki (JP); Fumihiro Goto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1114 days.

(21) Appl. No.: 12/145,007

(22) Filed: Jun. 24, 2008

(65) Prior Publication Data

US 2009/0002734 A1  Jan. 1, 2009

(30) Foreign Application Priority Data

Jun. 29, 2007  (JP) ................................. 2007-173117
Jun. 16, 2008  (JP) ................................. 2008-156999

(51) Int. Cl.
*G06F 3/00* (2006.01)
*G06K 1/00* (2006.01)
*G06K 9/00* (2006.01)

(52) U.S. Cl.
USPC ............ 358/518; 358/1.9; 358/520; 358/523; 382/167

(58) Field of Classification Search
None
See application file for complete search history.

(56) References Cited

U.S. PATENT DOCUMENTS

| | | | | |
|---|---|---|---|---|
| 4,831,434 | A | * | 5/1989 | Fuchsberger ................. 358/521 |
| 5,363,218 | A | | 11/1994 | Hoshino |
| 5,594,558 | A | | 1/1997 | Usami et al. |
| 5,844,699 | A | | 12/1998 | Usami et al. |
| 2005/0276474 | A1 | * | 12/2005 | Um et al. ...................... 382/167 |
| 2006/0274340 | A1 | * | 12/2006 | Yamazoe ....................... 358/1.9 |
| 2007/0041028 | A1 | * | 2/2007 | Seko .............................. 358/1.9 |

FOREIGN PATENT DOCUMENTS

| | | |
|---|---|---|
| JP | 4-196675 | 7/1992 |
| JP | 4-217167 | 8/1992 |
| JP | 2001-028694 | 1/2001 |

* cited by examiner

*Primary Examiner* — Vincent Rudolph
*Assistant Examiner* — Peter L Cheng
(74) *Attorney, Agent, or Firm* — Fitzpatrick, Cella, Harper & Scinto

(57) ABSTRACT

There is provided an image copying apparatus provided with a scanner and a printer, the image copying apparatus comprising: an obtaining unit which obtains image data by causing the scanner to scan an image of an original; a correction unit which performs correction processing that adds, to saturation, a value corresponding to a difference between lightness before and after performing predetermined editing processing on the image data, with respect to a region where a correction is performed designated near the maximum saturation of a color gamut of the printer; and a control unit which causes the printer to print the image data corrected by the correction unit.

16 Claims, 17 Drawing Sheets

FIG. 2

| (R, G, B) | (AdobeR1, AdobeG1, AdobeB1) |
|---|---|
| (0, 0, 0) | (0, 0, 0) |
| (0, 0, 16) | (0, 0, 18) |
| (0, 0, 32) | (0, 0, 40) |
| ⋮ | ⋮ |
| ⋮ | ⋮ |
| (255, 255, 240) | (255, 255, 235) |
| (255, 255, 255) | (255, 255, 255) |

FIG. 4

| (R, G, B) | (C, M, Y, K, PC, PM) |
|---|---|
| (0, 0, 0) | (0, 0, 0, 255, 0, 0) |
| (0, 0, 16) | (18, 16, 0, 246, 0, 0) |
| (0, 0, 32) | (33, 31, 0, 224, 0, 0) |
| ⋮ | ⋮ |
| ⋮ | ⋮ |
| (255,255) | (0, 0, 15, 0, 0, 0) |
| (255,255,255) | (0, 0, 0, 0, 0, 0) |

FIG. 11
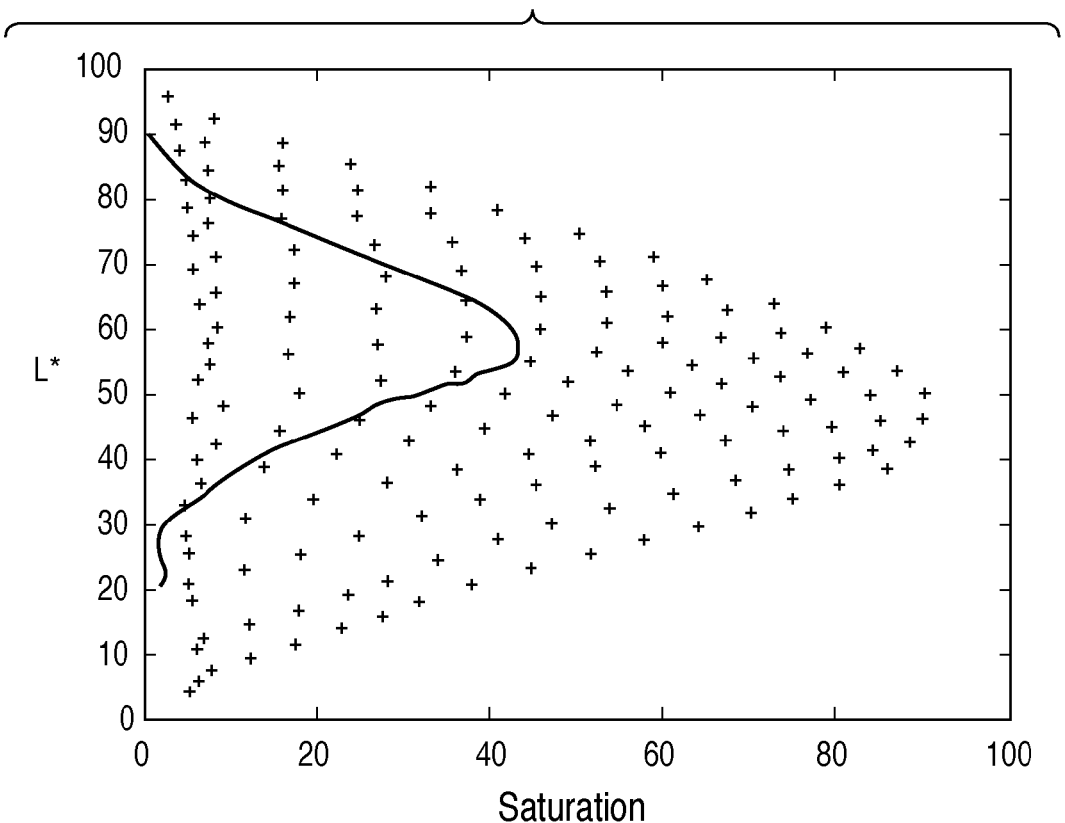
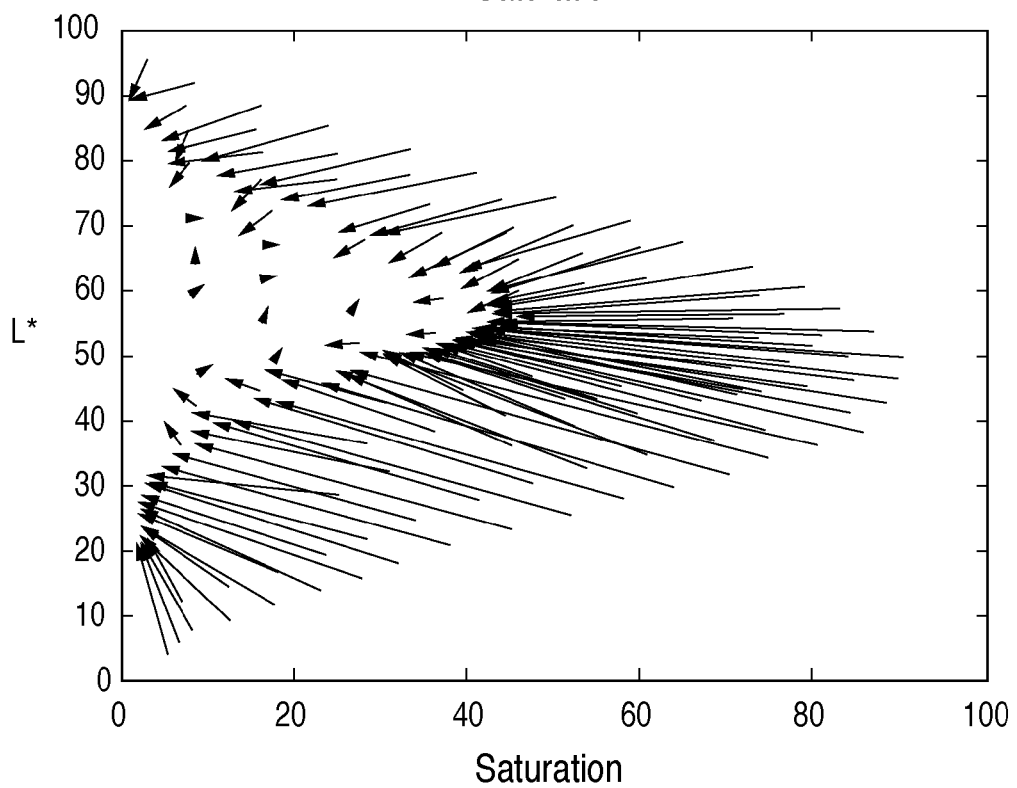

F I G. 15
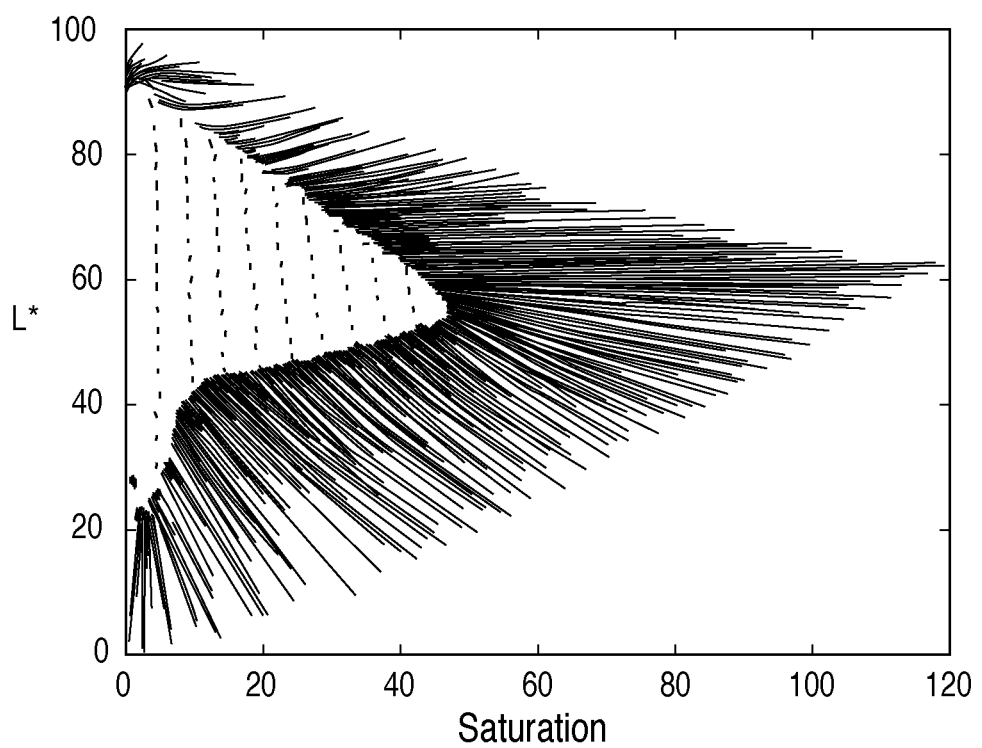

FIG. 17
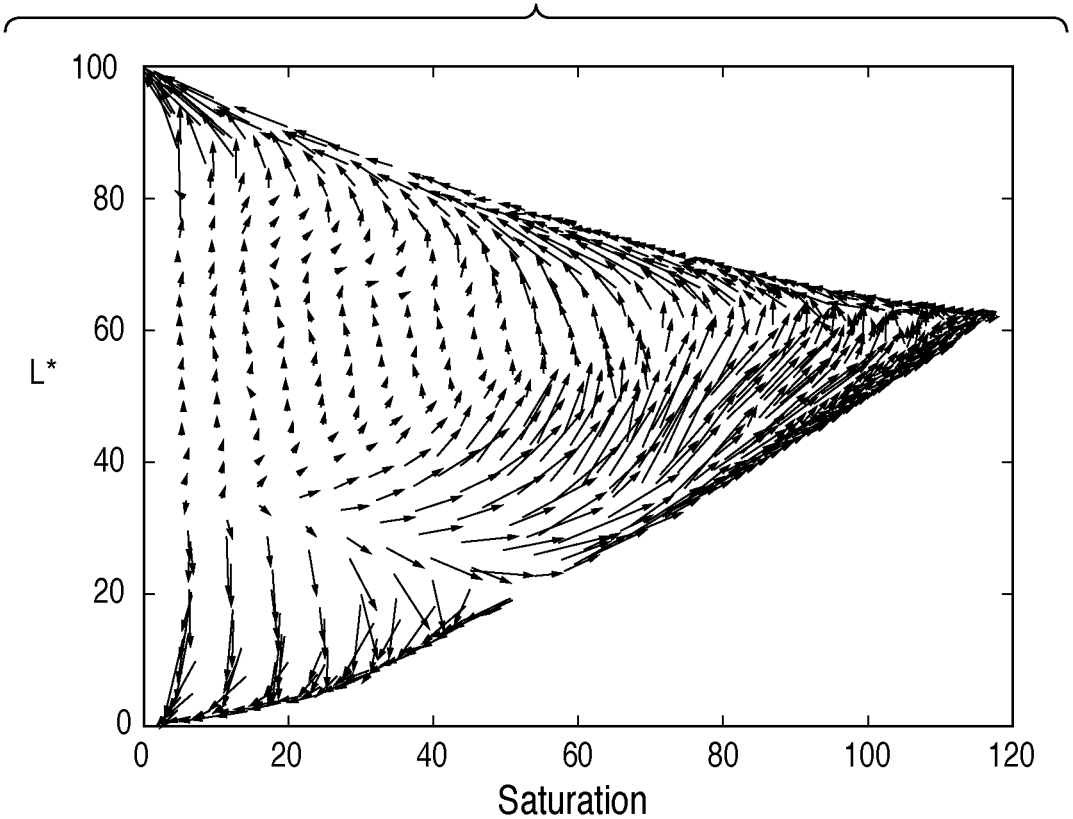
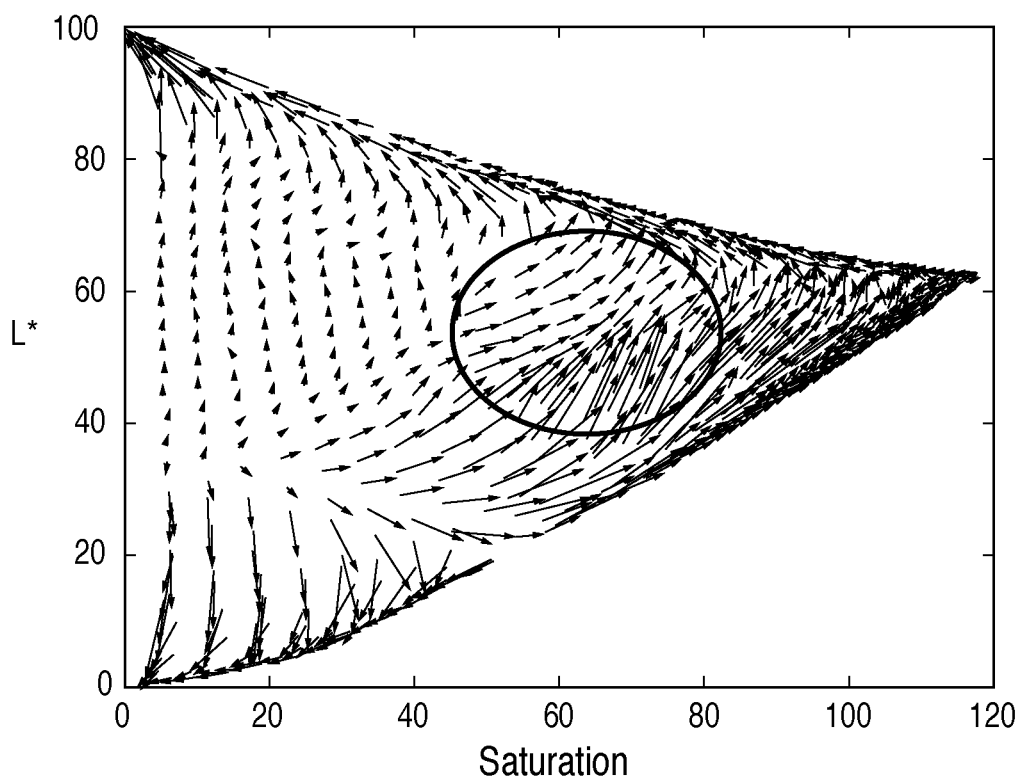

TABLE GENERATING APPARATUS, TABLE GENERATING METHOD, IMAGE PROCESSING APPARATUS, AND IMAGE PROCESSING METHOD

BACKGROUND OF THE INVENTION

1. Field of the Invention

The present invention relates to an image copying apparatus equipped with a scanner and a printer, a control method therefor, a program, and a method for generating a 3D-LUT.

2. Description of the Related Art

Image copying apparatuses are equipped with an input device, such as a scanner and an output device, such as a printer. Image copying apparatuses, for example, optically scan an original using a scanner, perform predetermined image processing on the obtained image data, and then output (print) the processed data using an output device.

Common input devices are those that irradiate an original with light using a fluorescent tube, an LED, or the like, and detect the light reflected from the original using a CCD. Common output devices are those that use a recording method such as an electrophotographic method, an ink jet method, etc.

Originals that have a broad color space, such as photographs, magazines, and the like, are often used. Moreover, input devices generally have a comparatively broad color gamut. On the other hand, although it does depend on the type of printing media used (e.g., glossy paper and photographic paper suitable for photographs, regular paper, which is most commonly used, and environmentally friendly recycled paper, among other such media), the color gamut of output devices is generally not as broad. In particular, there are many printing media, such as regular paper, that have very narrow color gamuts that can be output compared with the color gamuts of input devices.

What is necessary in such a case is a color space compression technique called gamut mapping. Gamut mapping determines how to express a color outside a color gamut, which cannot be output as-is, and furthermore, determines how to handle the color spaces within a color gamut. Methods thereof are generally roughly classified into two types: colorimetric (colorimetric matching method) and perceptual (perception-oriented method). The former gives priority to color reproducibility. Mapping is performed such that reproducible colors are expressed in colors identical to the original colors as much possible, and irreproducible colors are expressed in colors most similar to the original colors. In this case, there is a problem that while colorimetric matching is sufficiently achieved with respect to reproducible colors, irreproducible colors may be mapped on a single point, thereby impairing tonality. On the other hand, the latter method, or the perception-oriented method, achieves perceptually favorable color reproduction taking into consideration the overall balance so as to maintain tonality. However, since printed colors do not necessarily colorimetrically match the colors provided on the original, colors that should be reproducible sometimes do not match. Moreover, when there is a large difference in color gamut between the input and output devices, a printed result sometimes appears dull, with decreased saturation.

Japanese Patent Laid-Open No. H4-196675 discloses a technique related to gamut mapping which compresses colors presented on a display, having a broad color gamut, to fall within the color gamut of a printer. When a color space within a color gamut is compressed, this technique carries out colorimetric matching without compressing a portion within a specific region; with respect to the other portions, it carries out compression in a specific direction according to the internal ratio of the specific region to the maximum saturation/lightness. According to Japanese Patent Laid-Open No. H4-196675, gamut mapping that rectifies the aforementioned disadvantages of the colorimetric and perceptual methods, and performs natural color reproduction can be realized.

In addition, the subject matter of Japanese Patent Laid-Open No. 2001-28694 performs extension processing with respect to input data within the color gamut of an output device, so as to use the output gamut broadly, and performs gamut mapping with respect to input data outside the color gamut so as to sufficiently take advantage of the spaces within the color gamut, thereby enabling the color gamut of an output device to be used as broadly as possible.

Japanese Patent Laid-Open No. H4-217167 discloses three types of color processing—color processing using the isochromatic color reproduction system, color processing using the compressed color reproduction system, and color processing using the expanded color reproduction system—where any of these is selected according to the input original. At this time, the pixel value of an input image is accumulated, and if the accumulated value of output color reproduction pixels is not more than the predetermined value of all of the pixels, the color processing of the isochromatic color reproduction system is selected. Thereby, when copying is performed using a previously copied image as an original (hereinafter referred to as a "third-generation copy"), the colors of the original image and the printed image match one another closely.

However, although Japanese Patent Laid-Open No. H4-196675A reduces the generation of color dullness caused by decreased saturation, by providing a colorimetric matching region, a severe reduction in saturation cannot be prevented when the output color gamut is significantly smaller than the input color gamut. Therefore, it is difficult to obtain a preferable image with contrast.

In addition, although Japanese Patent Laid-Open No. 2001-28694 achieves favorable color reproduction by gamut mapping, which effectively uses the color space of the output color gamut, the reproducibility of the colors of the original image in the output image is poor. Therefore, when copying is performed in which faithful reproduction of a color is required, the image processing of Japanese Patent Laid-Open No. 2001-28694 is not preferable.

These problems are prominent in third-generation copying. With the subject matter of Japanese Patent Laid-Open No. H4-196675, the colors present in a compression region are further changed in third-generation copying, and the printed image appears even more different from the original image. The technique of Japanese Patent Laid-Open No. 2001-28694, too, cannot obtain a faithful copy due to over-coloring, or the like, caused by extension processing.

Although Japanese Patent Laid-Open No. H4-217167 takes third-generation copying into consideration, the input original has to be examined. Therefore, an operation called prescanning, by which an original is scanned prior to copying, is necessary, and memory space for storing the data of the entire scanned image is required. As a result, usability is impaired due to the long period of time required from when a request to start copying is made until the completion of copy processing. Moreover, installing a large-capacity memory for retaining the input image data increases the cost. Furthermore, information of the details of a plurality of processing procedures must be stored, and when a large-volume table is used in processing, a large ROM capacity is, therefore, required to store the same number of tables as there are processes.

SUMMARY OF THE INVENTION

The present invention was conceived in light of these situations. That is, the present invention provides a technique for enhancing reproducibility of the colors of an original image in an output image for an image copying apparatus, in which the color gamut of an input device is greater than the color gamut of an output device, while at the same time, suppressing an increase in the cost of an image copying apparatus.

According to an aspect of the present invention, an image copying apparatus is provided with a scanner and a printer, the image copying apparatus comprising an obtaining unit which obtains image data by causing the scanner to scan an image of an original, a correction unit which performs correction processing that adds, to saturation, a value corresponding to a difference between lightness before and after performing predetermined editing processing on the image data, with respect to a region where a correction is performed designated near the maximum saturation of a color gamut of the printer, and a control unit which causes the printer to print the image data corrected by the correction unit.

According to another aspect of the present invention, a method for controlling an image copying apparatus provided with a scanner and a printer, comprises the steps of obtaining image data by causing the scanner to scan an image of an original, performing a correction process to add, to saturation, a value corresponding to a difference between lightness before and after performing predetermined editing processing on the image data, with respect to a region where a correction is performed designated near the maximum saturation of a color gamut of the printer, and controlling the printer to cause the printer to print the image data corrected in the step of performing a correction process.

According to yet another aspect of the present invention, a computer program is stored in a computer-readable storage medium, the program causing a computer provided with a scanner and a printer to function as an obtaining unit which obtains image data by causing the scanner to scan an image of an original, a correction unit which performs correction processing to add, to saturation, a value corresponding to a difference between lightness before and after performing predetermined editing processing on the image data with respect to a region where a correction is performed designated near the maximum saturation of a color gamut of the printer, and a control unit which causes the printer to print the image data corrected by the correction unit.

According to another aspect of the present invention, there is provided a method for generating a three-dimensional look up table used in a correction by an image copying apparatus that is provided with a scanner and a printer and that obtains image data by causing the scanner to scan an image of an original, corrects the obtained image data, and causes the printer to print the corrected image data, the method comprising the steps of designating a region near the maximum saturation of a color gamut of the printer where the correction is performed, performing correction processing to add, to saturation, a value corresponding to a difference in lightness before and after performing predetermined editing processing on the image data with respect to the region where the correction is performed, and registering, in the 3D-LUT, a value of the image data corrected in the editing processing and the step of performing correction processing, as an output value corresponding to a value of the input image data.

Further features of the present invention will become apparent from the following description of exemplary embodiments with reference to the attached drawings.

BRIEF DESCRIPTION OF THE DRAWINGS

FIG. 2 is a diagram showing an example of a three-dimensional look-up table (3D-LUT) for the processing in S102 of FIG. 1.

FIG. 4 is a diagram showing an example of a 3D-LUT for color separation processing.

FIG. 11 contains diagrams showing an outline of gamut mapping using a 3D-LUT.

FIG. 15 is a diagram showing color reproduction in copying performed by an image copying apparatus equipped with an ink-jet printer.

FIG. 17 shows diagrams showing an outline of the editing table application processing of S103 in FIG. 1 when the correction processing of S608 in FIG. 6 is performed (below) and when not performed (above).

DESCRIPTION OF THE EMBODIMENTS

Preferred embodiments of the present invention will now be described with reference to the attached drawings. Each embodiment described below will be helpful in understanding a variety of concepts from the generic to the more specific.

It should be noted that the technical scope of the present invention is defined by the claims, and is not limited by any embodiment described below. In addition, not all combinations of the features described in the embodiments are necessarily required for realizing the present invention.

First Embodiment

Figure 12:
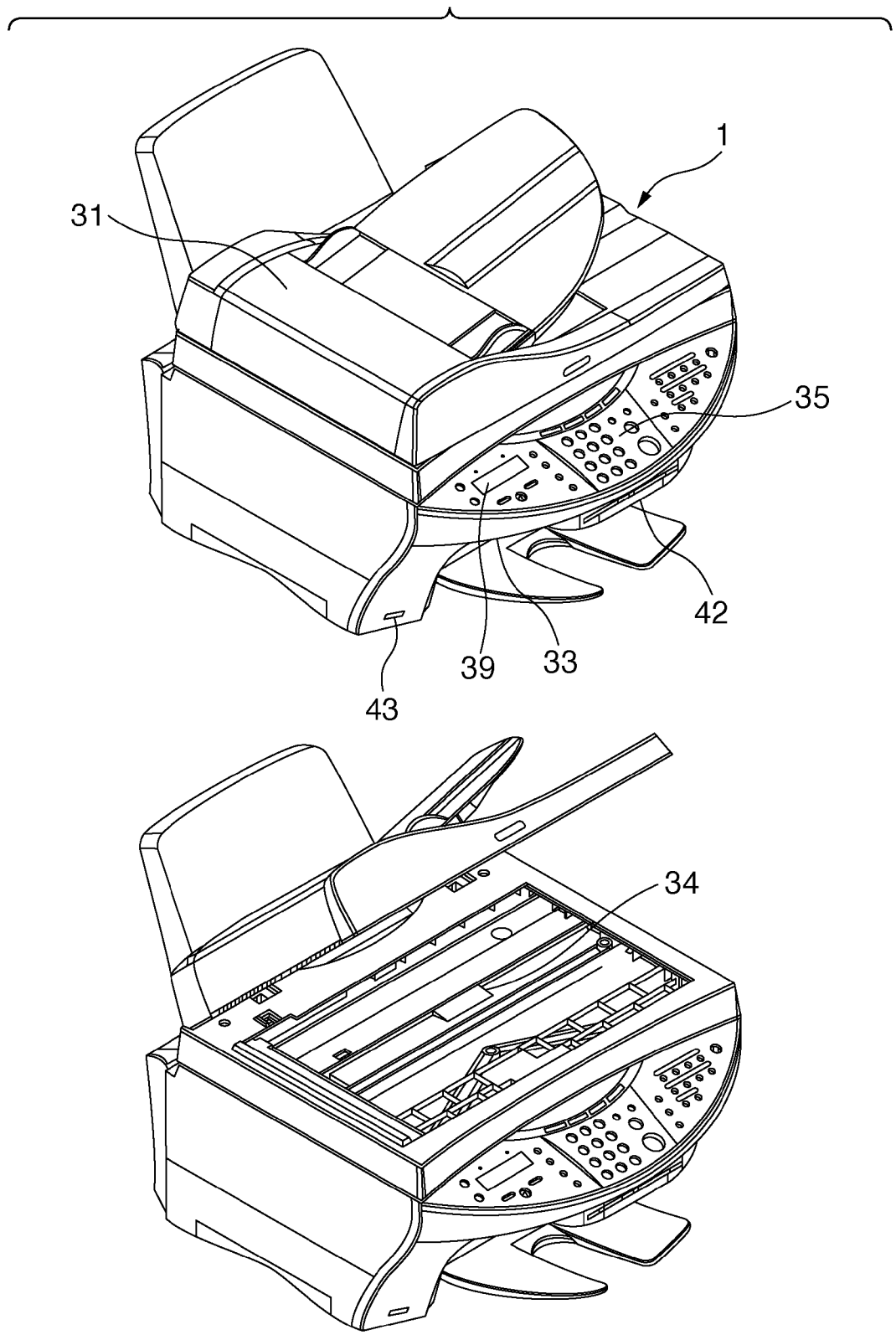
FIG. 12 shows perspective drawings showing an outline of an image copying apparatus according to the first embodiment.

FIG. 12 contains outline perspective drawings of an image copying apparatus 1 according to the first embodiment of the present invention. The image copying apparatus 1 functions as an ordinary PC printer, which receives data from a host computer (PC) and performs printing thereof, and also functions as a scanner. In addition, the image copying apparatus has, as stand-alone functions, a copier function for printing an image scanned by a scanner using a printer and a function by which image data stored in a storage medium, such as a memory card, is directly scanned and printed. Furthermore, the image copying apparatus has a function for receiving image data from a digital camera and printing the data.

In FIG. 12, the image copying apparatus 1 is equipped with a scanning device 34, such as a flatbed scanner, or the like, a printing device 33, such as an ink jet printer, an electrophotographic printer, or the like, and a console panel 35 furnished with a display panel 39, various key switches, etc. Moreover, a USB port (not shown) for communication with a personal computer (PC) is disposed on the reverse surface of the image copying apparatus 1, and communication with the PC is carried out using it. In addition to the above-described configuration, the image copying apparatus 1 is equipped with a card slot 42 for reading data from various memory cards and a camera port 43 for data communication with digital cameras. Furthermore, the image copying apparatus is equipped with an auto document feeder (ADF) 31 for automatically placing an original on a platen.

Figure 13:
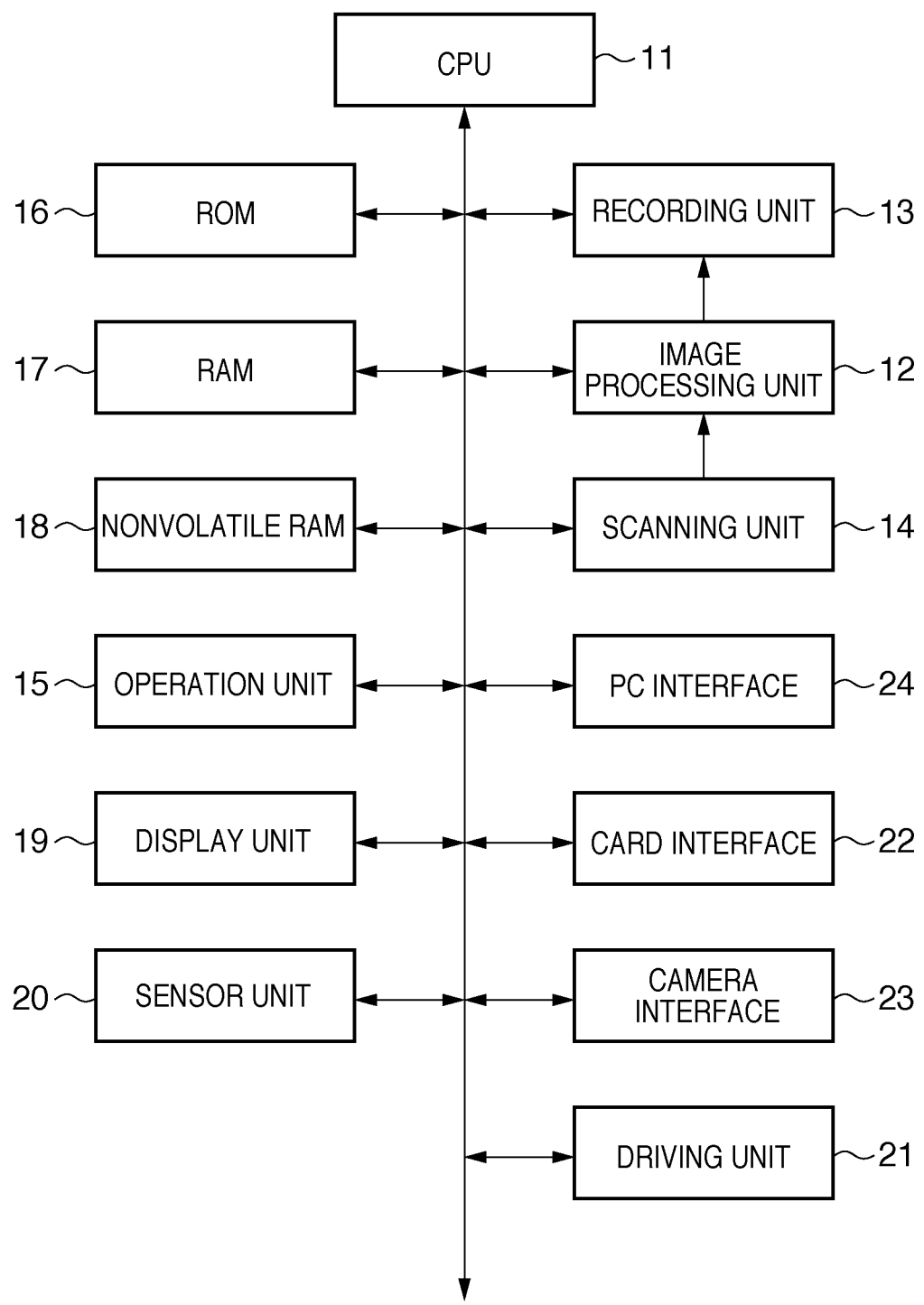
FIG. 13 is a functional block diagram of an image copying apparatus according to the first embodiment.

FIG. 13 is a functional block diagram of the image copying apparatus 1. In FIG. 13, a CPU 11 controls the various functions of the image copying apparatus 1 and executes the image processing programs stored in a ROM 16 according to a specific operation of an operation unit 15.

A scanning unit 14 equipped with a CCD corresponds to the scanning device 34 of FIG. 12, and scans an original image and outputs analog brightness data of red (R), green (G) and blue (B). The scanning unit 14 may be equipped with a contact-type image sensor (CIS) in place of a CCD. Moreover, if the scanning unit is equipped with the ADF 31 shown in FIG. 12, order sheets can be scanned in succession, thereby enhancing convenience.

A card interface 22 corresponds to the card slot 42 of FIG. 12. The card slot 42 reads, according a specific operation of the operation unit 15, data taken by, for example, a digital still camera (DSC) and stored in a memory card, or the like. The color space of the image data read via the card interface 22 is, if necessary, converted into the standard RGB color space (for example, NTSC-RGB or sRGB) from the color space of the DSC (for example, YCbCr) by an image processing unit 12. Based on the header information of the image data, the read image data is subjected as necessary to various types of processing necessary for applications, such as definition conversion to attain effective pixels.

A camera interface 23 corresponds to the camera port 43 of FIG. 12, and is directly connected with the DSC to read image data.

The image processing unit 12 performs image processing, such as shading correction, color conversion, editing processing, gamut compression processing, color separation, quantization, and the like, of the read signal values, which will be described below, and the data obtained therefrom (corrected data) is stored in a RAM 17. And, when the corrected data stored in the RAM 17 reaches a specific amount necessary for recording at a recording unit 13, which corresponds to the printing device 33 of FIG. 12, a recording operation is executed by the recording unit 13.

A nonvolatile RAM 18 is a battery backed-up SRAM, or the like, and stores data specific to the image processing device or like information. Moreover, the operation unit 15 corresponds to the console panel 35 of FIG. 12, and selects the image data stored in the storage medium. In order to start recording, the operation unit 15 is provided with a start key to start direct PC-less photo printing and a key to print order sheets. In addition, the operation unit 15 is furnished with a key to allow an order sheet to be read, a copy-start key for use in black and white copying and color copying, and a mode key for specifying the mode for copy resolution, image quality, etc. Furthermore, the operation unit 15 is furnished with a stop key to stop the copying operation, a ten-key numeric keypad to input the number of copies, a register key, etc. The CPU 11 detects which keys are pressed and controls each unit according to the pressed keys.

A display 19 corresponds to the display panel 39 of FIG. 12, is equipped with a dot-matrix type liquid crystal display (LCD) unit and an LCD driver, and provides various displays according to the control of the CPU 11. Moreover, the display 19 shows the thumbnails of the image data recorded on the storage medium. The recording unit 13 corresponds to the printer 33 of FIG. 12, is composed of an inkjet-type ink jet head, a general-purpose IC, and the like, and reads the recorded data stored in the RAM 17 and outputs the data as a hardcopy through printing according to the control of the CPU 11.

A driving unit 21 includes, for use in the operations of both the aforementioned scanning unit 14 and recording unit 13, a stepping motor for driving paper-feeding/discharging rollers, gears for transmitting the driving force of the stepping motor, a driver circuit for controlling the stepping motor, etc.

A sensor unit 20 includes a width sensor for recording paper, a sensor for indicating the presence or absence of recording paper, a width sensor for originals, a sensor for detecting recording media, etc. The CPU 11 detects the state of an original and recording paper based on the information acquired from these sensors.

A PC interface 24 is an interface between the PC and the image copying apparatus 1, and the image copying apparatus 1 performs printing, scanning and like operations with instructions from the PC via the PC interface 24.

During a copying operation, the image data scanned by the scanning device 34 is data-processed inside the image copying apparatus and printed by the printing device 33.

When a copying operation is instructed through the operation unit 15, the scanning unit 14 scans an original placed on the platen. The scanned data is forwarded to the image processing unit 12, subjected to image processing as described below, and then forwarded to the recording unit 13 for printing.

Figure 1:
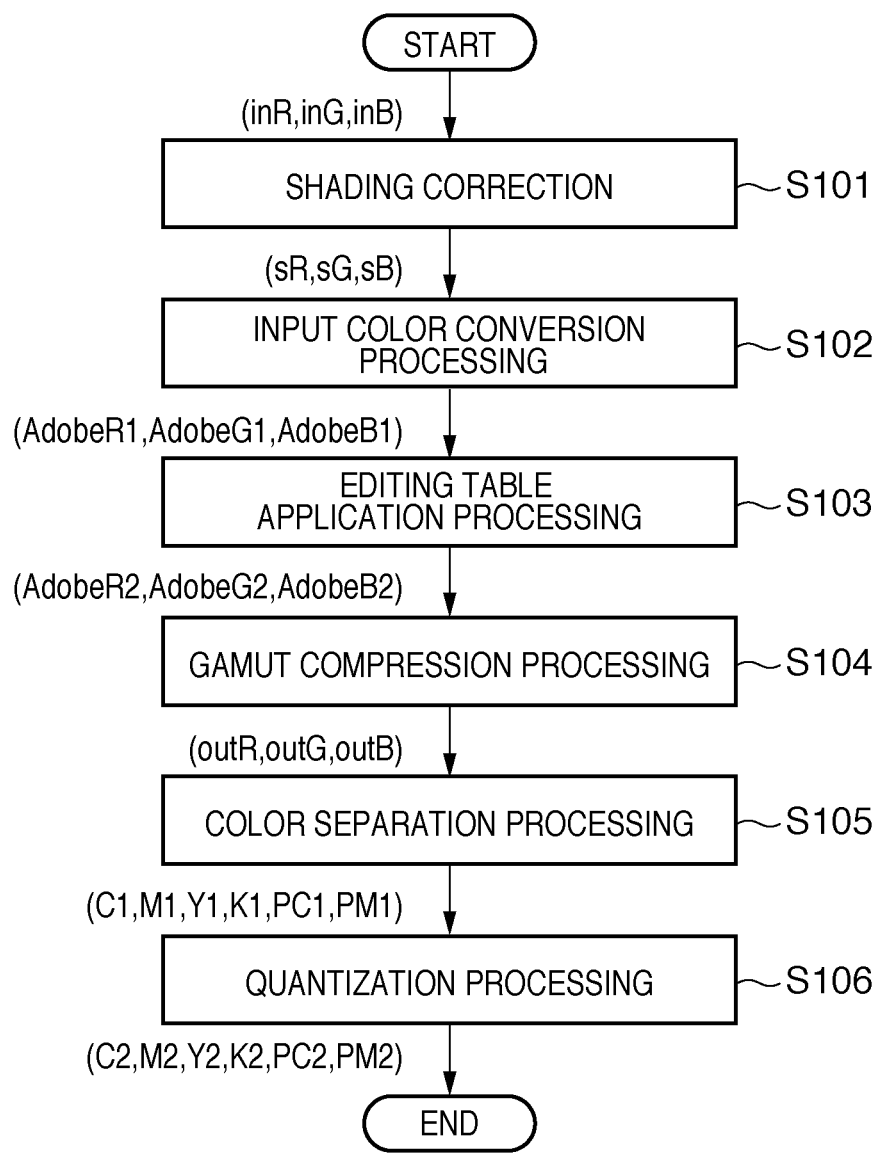
FIG. 1 is a flow chart showing an image processing flow in a copying operation performed by an image copying apparatus according to the first embodiment.

Next, the image processing upon image copying processing (copying) being executed by the image processing unit 12 of FIG. 13 shall be described. FIG. 1 shows a flow chart of the image processing.

The scanned image signal values (inR, inG, inB) undergo a shading correction in S101. Thereby, a correction against the variation caused by the input scanning elements is performed, converting the values into (sR, sG, sB).

Input color conversion processing is performed in S102. The purpose of this processing is to convert the signal values (sR, sG, sB) dependent on the input device into device-independent color space xRGB. Common examples of xRGB include sRGB, Adobe RGB, etc. However, the color space is not particularly limited to commonly-used color spaces, and an optimal color space may be defined individually and used.

In this embodiment, a description is given for conversion into the Adobe RGB color space. Thereby, the input image is converted into (Adobe R1, Adobe G1, Adobe B1). A matrix conversion as shown below is used as the converting method.

$$\begin{pmatrix} AdobeR1 \\ AdobeG1 \\ AdobeB1 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} sR \\ sG \\ sB \end{pmatrix} \quad \text{Formula 1}$$

$M_{11}$ to $M_{33}$ in the formula are matrix coefficients provided in advance. Although the formula given above shows a primary matrix as an example, a multi matrix can be used as well.

Moreover, in place of the matrix conversion method, an interpolation method using a tetrahedron may be used. In tetrahedral interpolation, a three-dimensional look-up table (hereinafter, 3D-LUT) is provided, in advance. These are stored in the ROM 16 in the image copying apparatus 1. Post-conversion data (here, values of Adobe R1, Adobe G1, and Adobe B1), corresponding to 4913 points obtained by dividing each RGB value into sixteen to be arranged in sixteen levels, is recorded in a 3D-LUT, as shown in FIG. 2. Values (Adobe R1, Adobe G1, Adobe B1) corresponding to values (sR, sG, sB) are referred to, and when values (sR, sG, sB) lie between the points divided into sixteen, interpolation processing is performed.

Figure 3A:
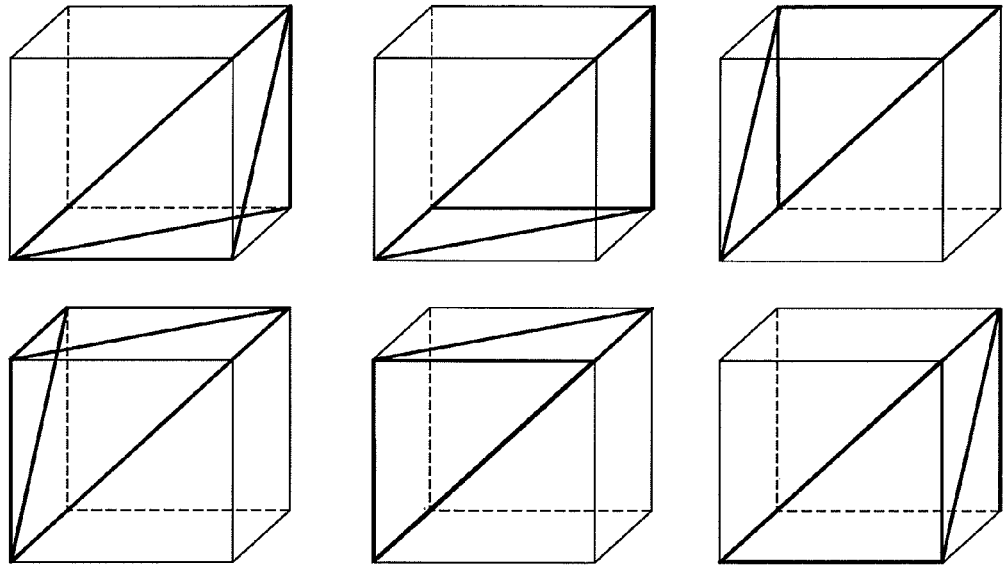
FIG. 3A is an explanatory drawing of interpolation using a 3D-LUT.
Figure 3B:
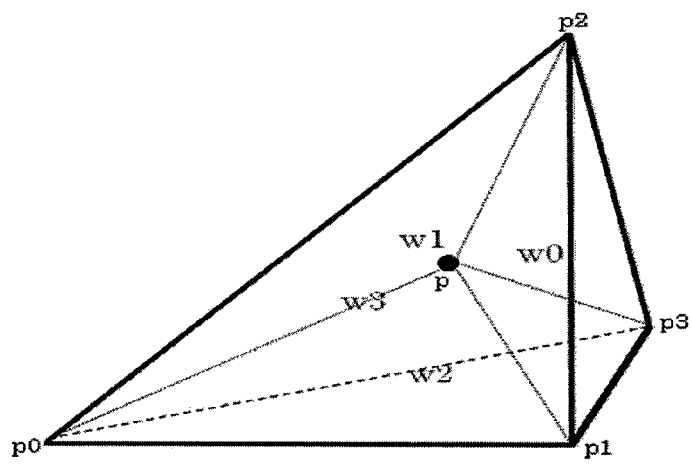
FIG. 3B is an explanatory drawing of interpolation using a 3D-LUT.

In the interpolation processing, linear interpolation is performed in which a division unit of a three-dimensional space is a tetrahedron and four lattice points are used. In the procedure, first, division into tetrahedrons is performed as shown in FIG. 3A. Then, which tetrahedron to which the target point p belongs is determined. The four vertices of a tetrahedron are p0, p1, p2 and p3, and it is further divided into smaller tetrahedrons as shown in FIG. 3B. If the converted value of each vertex is f(p0), f(p1), f(p2) and f(p3), it can be obtained with the following formula.

$$f(p) = \sum_{i=0}^{3} wi \times f(pi) = [w0, w1, w2, w3] \begin{bmatrix} f(p0) \\ f(p1) \\ f(p2) \\ f(p3) \end{bmatrix} \quad \text{Formula 2}$$

In the formula, w0, w1, w2 and w3 represent the volume ratios of the small tetrahedrons at positions opposing to each vertex pi. Conversion into Adobe R1, Adobe G1 and Adobe B1 is performed in this manner.

Next, editing table application processing is performed in S103. When the input data (Adobe R1, Adobe G1, Adobe B1) is outside the output color gamut, it is converted into values (Adobe R2, Adobe G2, Adobe B2) on which specific editing processing have been performed using a 3D-LUT generated according to a method as described below. When the input data is within the output color gamut, no specific color conversion is performed, and (Adobe R1, Adobe G1, Adobe B1)=(Adobe R2, Adobe G2, Adobe B2).

In S104, (Adobe R2, Adobe G2, Adobe B2) to which editing table application processing have been performed are converted into data dependent upon the output device (outR, outG, outB). This conversion processing (gamut compression processing) is for mapping (gamut mapping) the image data (Adobe R2, Adobe G2, Adobe B2) to be within the color gamut of the printing device. Gamut mapping is performed, as in S102 and S103, according to tetrahedral interpolation processing using a 3D-LUT. The details of a method for generating a 3D-LUT for this gamut compression will be described later.

In S105, the data in the RGB format obtained in S104 (outR, outG, outB) is reduced to ink colors that are used in actual recording (printing). The reduction method uses tetrahedral interpolation processing using a 3D-LUT as above. In connection with, for example, an ink jet printer, it is common to use cyan, magenta, yellow, and black inks (hereinafter, C, M, Y, K). With latest printers focused on photograph image quality, low-concentration photocyan and photomagenta (hereinafter, PC, PM) are sometimes used in addition to the aforementioned inks, and a 3D-LUT in such a case may look like a table shown in FIG. 4.

The image data (C1, M1, Y1, K1, PC1, PM1), which takes an ink form in S106, undergoes quantization processing. This processing converts the data such that it has the number of tones which the recording device can output. The ink jet printer of this embodiment is an FM screening-type printer which forms images by dotting or not dotting ink droplets, and in this embodiment, the quantization processing is described using binarization as an example. An error diffusion method is used as the quantization method. Input signals are 0 to 255 (8-bit).

Figure 5:
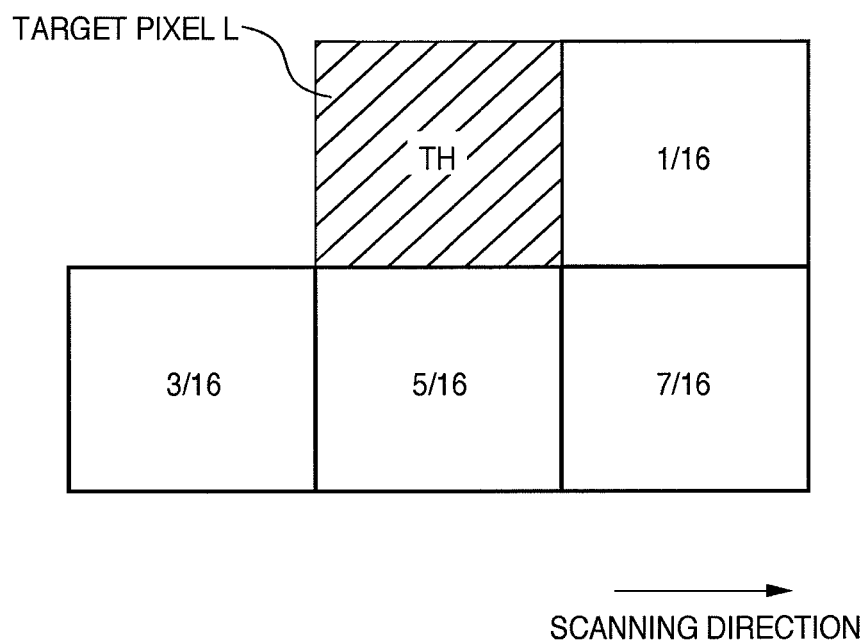
FIG. 5 is a diagram showing an error distribution method in error diffusion processing.

FIG. 5 is a diagram showing an error distribution method in the error diffusion processing. When the signal value of the target pixel is L ($0 \leq L \leq 255$), comparison with threshold TH is carried out. According to the size thereof, it is determined as L>TH . . . 1 (recording); and L≤TH . . . 0 (not recording).

Error E (=L−TH) generated in this instance is distributed to peripheral pixels according to the distribution coefficient of FIG. 5. By performing this processing on all the pixels and all the ink colors (C, M, Y, K, PC, PM), 1-bit image data (C2, M2, Y2, K2, PC2, PM2) can be obtained.

As described above, by carrying out S101 to S106 described using the flow chart, it is possible to convert scanned image data into a printable form.

Next, color reproduction of image copying processing, which is a feature of the present invention, shall be described. As described above, color reproduction is determined through S103 (editing table application processing) and S104 (gamut compression processing) of FIG. 1. A 3D-LUT can be used for processing of this type. A method for generating a 3D-LUT for these processings will be described below. A 3D-LUT which is generated in advance is stored in, for example, the ROM 16 and used in S103 and S104 during a copying operation.

Figure 6:
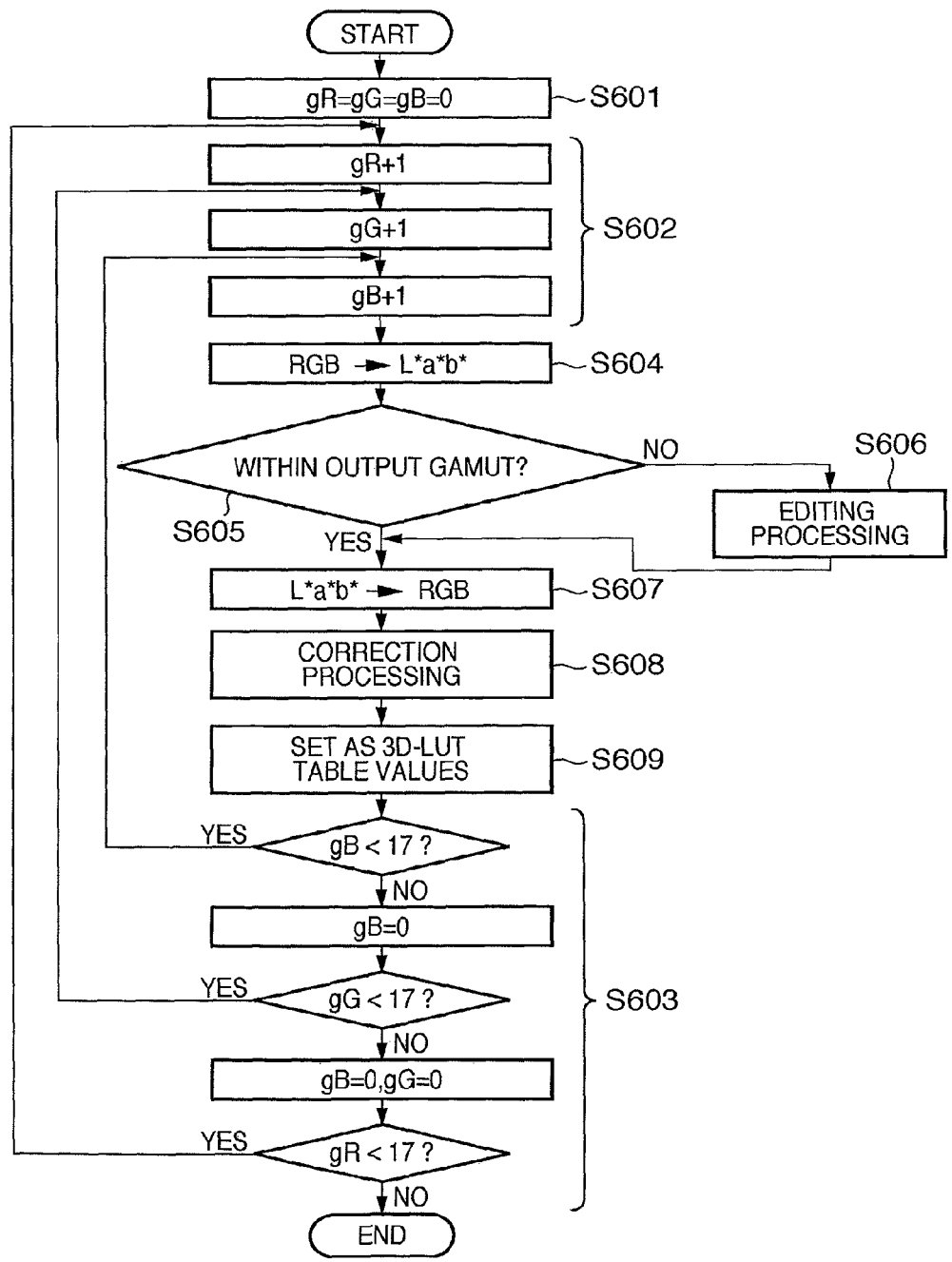
FIG. 6 is a flow chart showing processing details for generating a 3D-LUT for the editing table application processing in S103 of FIG. 1.

While the description given below discloses a principal concept of generating a 3D-LUT suitable for the present invention, a 3D-LUT is usually generated through trial and error. Therefore, in order to enhance the color reproducibility in the copying operation, it is acceptable that part of the eventually-generated 3D-LUT may deviate from this principal concept due to a partial modification. For example, when the flow chart of FIG. 6 is strictly followed, no editing processing is performed on the input data within the output gamut (described later with reference to S605 and S606), and therefore, no emphasis on contrast is made. However, in practice, a 3D-LUT with which editing processing has been performed on the input data within the output gamut may be generated through trial and error for obtaining better contrast.

A 3D-LUT is created by dividing each 8-bit (0-255) input RGB value into sixteen with an increment of sixteen. Grid points gR, gG and gB each represent the following seventeen points in the RGB values:

(0, 16, 32, 48, 64, 80, 96, 112, 128, 144, 160, 176, 192, 208, 224, 240, 255).

In the description given below, the grid point numbers are one to seventeen (for example, when gR=2, the value of R is 16).

FIG. 6 is a flow chart showing the details of processing for generating a 3D-LUT for the editing table application processing in S103 of FIG. 1.

In S601, initially, gR=gG=gB=0. The eight blocks, that is, S602 to S603, show that each value of the grids (gR, gG, gB) is changed from one to seventeen and the process is looped. Thereby, the process of S604 to S609 is repeated three times for seventeen grids, or 4913 times.

In S604, the RGB signal values corresponding to the present grids are converted into L*a*b*. In particular, $R = (gR-1) \times 16$ (provided that when $R > 255$, $R = 255$);

$G = (gG-1) \times 16$ (provided that when $G > 255$, $G = 255$); and $B = (gB-1) \times 16$ (provided that when $B > 255$, $B = 255$), and these RGB values are converted into L*a*b*. In the conversion process, first, the RGB values at the grid points gR, gG and gB are treated as RGB values of the Adobe RGB and converted into XYZ values which are tristimulus values in an assumed light source. By assigning the XYZ values to the following formulas, L*a*b* is obtained:

When $Y/Yn > 0.008856$, $X/Xn > 0.008856$, and $Z/Zn > 0.008856$, $L^* = 116(Y/Yn)^{1/3} - 16$ $a^* = 500\{(X/Xn)^{1/3} - (Y/Yn)^{1/3}\}$ $b^* = 200\{(Y/Yn)^{1/3} - (Z/Zn)^{1/3}\}$ And in other cases, the formulas above are replaced by, $(X/Xn)^{1/3} \rightarrow 7.787(X/Xn) + 16/116$ $(Y/Yn)^{1/3} \rightarrow 7.787(Y/Yn) + 16/116$ $(Z/Zn)^{1/3} \rightarrow 7.787(Z/Zn) + 16/116$.

Here, Xn, Yn and Zn are tristimulus values of a perfect reflection plane and are normalized with Yn=100.

In S605, it is determined whether or not the L*a*b* values obtained in S604 are within the gamut of the output device (printing device 33). One example of a determination method is to collect the gamut data of the output device in advance and compare the L*a*b* values with the data. In particular, the cross section of L* which is a subject of the determination is extracted, a hue is obtained from a*b*, and respective saturations in the hue direction are compared.

When the RGB values of the present grid point are determined as being within the output gamut, the procedure advances to S607, and when the RGB values are not within the output gamut, the procedure goes to S606 and editing processing is performed.

In the editing processing of S606, lightness and saturation are edited and the L*a*b* obtained in S604 is made into data that is sharp and has more contrast. Here, tables in which the extent of editing is provided are collected in advance, and the signal values are changed according to the tables. Two tables are provided for lightness and saturation, that is, TABLE_L and TABLE_S, and lightness is obtained using:

Output $L^* = $ TABLE_L[Input $L^*$]

With respect to saturation, input saturation S is obtained with a* and b* using:

Input saturation $S = (a^* \times a^* + b^* \times b^*)^{1/2}$

Saturation correction coefficient w is obtained using:

$w = $ TABLE_S[Input saturation $S$]

Editing processing is performed by multiplying a* and b* by w.

Output $a^* = $ Input $a^* \times w$

Output $b^* = $ Input $b^* \times w$

Thereby, L*a*b* values edited to emphasize the contrast are obtained. Then, the procedure advances to S607. The editing processing of S606 includes more than one method, and each supports a mode used according to the conditions upon copying. Examples include editing processing carried out when a user selects a mode in which brightness is emphasized or when this mode is automatically selected, editing processing for enhancing overall lightness and saturation carried out with a mode used when the recording paper is regular paper, and editing processing for enhancing lightness and saturation, which is a part of a mode in which the ground color of an original image is removed.

In S607, the L*a*b* values are converted back into RGB signals. This conversion can be attained by performing the conversion of S604 in a reversed manner. When the procedure has not progressed via S606 (that is, when no editing processing has been performed), the original RGB values are obtained by this reverse conversion.

In S608, correction processing as described below is performed on the RGB values obtained by the conversion processing in S607.

In S609, the RGB values obtained as a result of the correction processing in S608 are set as table values of the present grid.

By applying the above-described processing to all grid points, a 3D-LUT for the editing table application process of S103 is generated.

Figure 14:
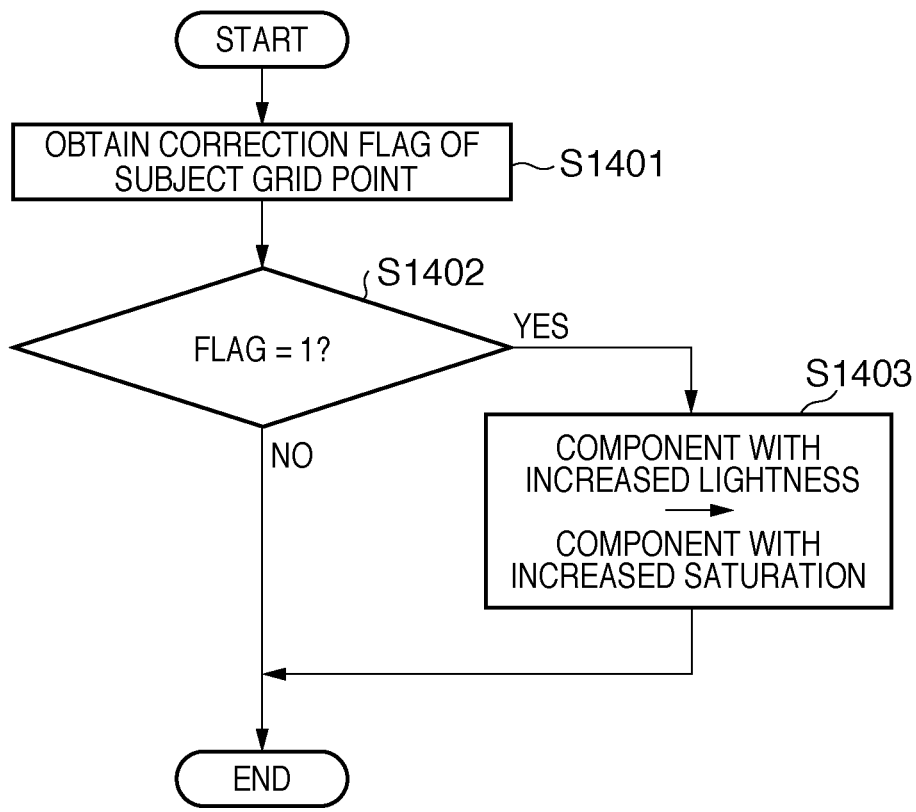
FIG. 14 is a flow chart showing details of the correction processing in step S608 of FIG. 6.

Next, a detailed description shall be given regarding the correction processing in S608. FIG. 14 is a flow chart showing a detailed flow of the correction processing in S608 of FIG. 6.

A correction flag of the present grid point (a grid point to be processed) is obtained in S1401. A correction flag is a value represented by 0 or 1 (binary data), indicating no correction when 0, and correction when 1. That is, correction flags are data represented by 0 or 1 for all 4913 lattice points. A method for generating the correction flag will be described later.

In S1402, it is determined whether or not the correction flag is 1. When the correction flag is 0 (OFF), no correction is performed, and the processing of this flow chart is terminated. When the correction flag is 1 (ON), the procedure advances to S1403.

In S1403, the amount of change in lightness by the editing processing in S606 of FIG. 6 is allocated to the increase in saturation. That is, the amount of change in lightness is decreased, and to that extent saturation is increased.

The purpose of the correction processing here is to prevent image deterioration accompanied by a significant increase in lightness and a decrease in saturation due to the editing processing.

The signal values before editing are $R_{ORG}$, $G_{ORG}$ and $B_{ORG}$, and the signal values after S607, that is, after the editing processing and RGB conversion, are $R_{COR}$, $G_{COR}$ and $B_{COR}$.

Here, the lightness components before and after editing are $I_{ORG}$ and $I_{COR}$, respectively, and the saturation components before and after editing are $C_{ORG}$ and $C_{COR}$, respectively. $I_{ORG}$ and $I_{COR}$ are respectively obtained using:

$I_{ORG} = \min(R_{ORG}, \min(G_{ORG}, B_{ORG}))$ $I_{COR} = \min(R_{COR}, \min(G_{COR}, B_{COR}))$.

$C_{ORG}$ and $C_{COR}$ are respectively obtained using:

$$C_{ORG}=\max(R_{ORG}-I_{ORG},\max(G_{ORG}-I_{ORG},B_{ORG}-I_{ORG}))$$

$$C_{COR}=\max(R_{COR}-I_{COR},\max(G_{COR}-I_{COR},B_{COR}-I_{COR})).$$

Here, min(a, b) and max(a, b) are functions for use in obtaining the minimum and maximum values among values (a, b).

Then, when the differences with respect to the lightness components and the saturation components before and after editing are ΔI and ΔC, respectively, ΔI and ΔC can be obtained using:

$$\Delta I = I_{COR} - I_{ORG}$$

$$\Delta C = C_{COR} - C_{ORG}.$$

Here, when the flag is 1, the increase in the lightness component is corrected using the following formula. In order to simplify the description given here, the object is a color between red-yellow, that is, its signal values satisfy:

$$R_{ORG} > G_{ORG} > B_{ORG}.$$

In this case, the signal values after correction $R_{NEW}$, $G_{NEW}$ and $B_{NEW}$ to be obtained can be expressed by the following formulas, respectively:

$$R_{NEW} = R_{ORG} + \Delta I + \Delta C$$

$$G_{NEW} = (R_{NEW} - I_{ORG})/\text{rate} + I_{ORG}$$

$$B_{NEW} = B_{ORG}.$$

Here, the term "rate" represents the ratio of the largest signal value and the second largest signal value for which the lightness components are removed. Here, the term means the ratio of the R signal to the G signal for which the lightness components are removed:

$$\text{rate} = (R_{ORG} - I_{ORG})/(G_{ORG} - I_{ORG}).$$

The same calculations are applied to the regions other than Yellow-Red, that is, yellow-green, green-cyan, cyan-blue, blue-magenta, and magenta-red.

When the values are determined as being within the output gamut in the determination processing of S605 and no editing processing of S606 is performed, the values at this time are:

$$R_{ORG} = R_{COR}$$

$$G_{ORG} = G_{COR}$$

$$B_{ORG} = B_{COR}.$$

Therefore, $$\Delta I = \Delta C = 0,$$

and as shown in the following formulas, absolutely no correction processing is applied as a result:

$$R_{NEW} = R_{ORG}$$

$$G_{NEW} = G_{ORG}$$

$$B_{NEW} = B_{ORG}.$$

Next, a flag that determines whether or not correction is needed shall be described. In this embodiment, a case in which a correction flag is 1 (ON) near the maximum saturation of the output device shall be described. Copying using regular paper by an image copying apparatus equipped with an ink jet printer has poor color reproducibility and insufficient chromogenic properties. Therefore, in the editing processing of S606, the gamut mapping for a color outside the color gamut performs conversion so as to carry out mapping to attain a color that has as much saturation and that looks as attractive as possible.

FIG. 15 is a diagram showing color reproduction in copying performed by an image copying apparatus equipped with an ink jet printer. White-Red-Black is featured as an example. In this diagram, the vertical axis represents lightness L* and the horizontal axis represents saturation S. The starting points of the arrows represent the points where Adobe RGB is allocated to seventeen lattice points, and the end points show the mapping destinations of the colors within the color gamut. According to this diagram, many of the colors that are outside the color gamut of regular paper are mapped on places corresponding to sides of a triangle that represents a reproducible color space. In particular, the portion depicting the maximum saturation has a concentration of colors, and it can be said that color reproduction often occurs in this vicinity in ordinary copying. That is, in third-generation copying in which the reproduced colors are used as an original, suppression of color deterioration at this portion greatly contributes to enhancing image quality.

Figure 16:
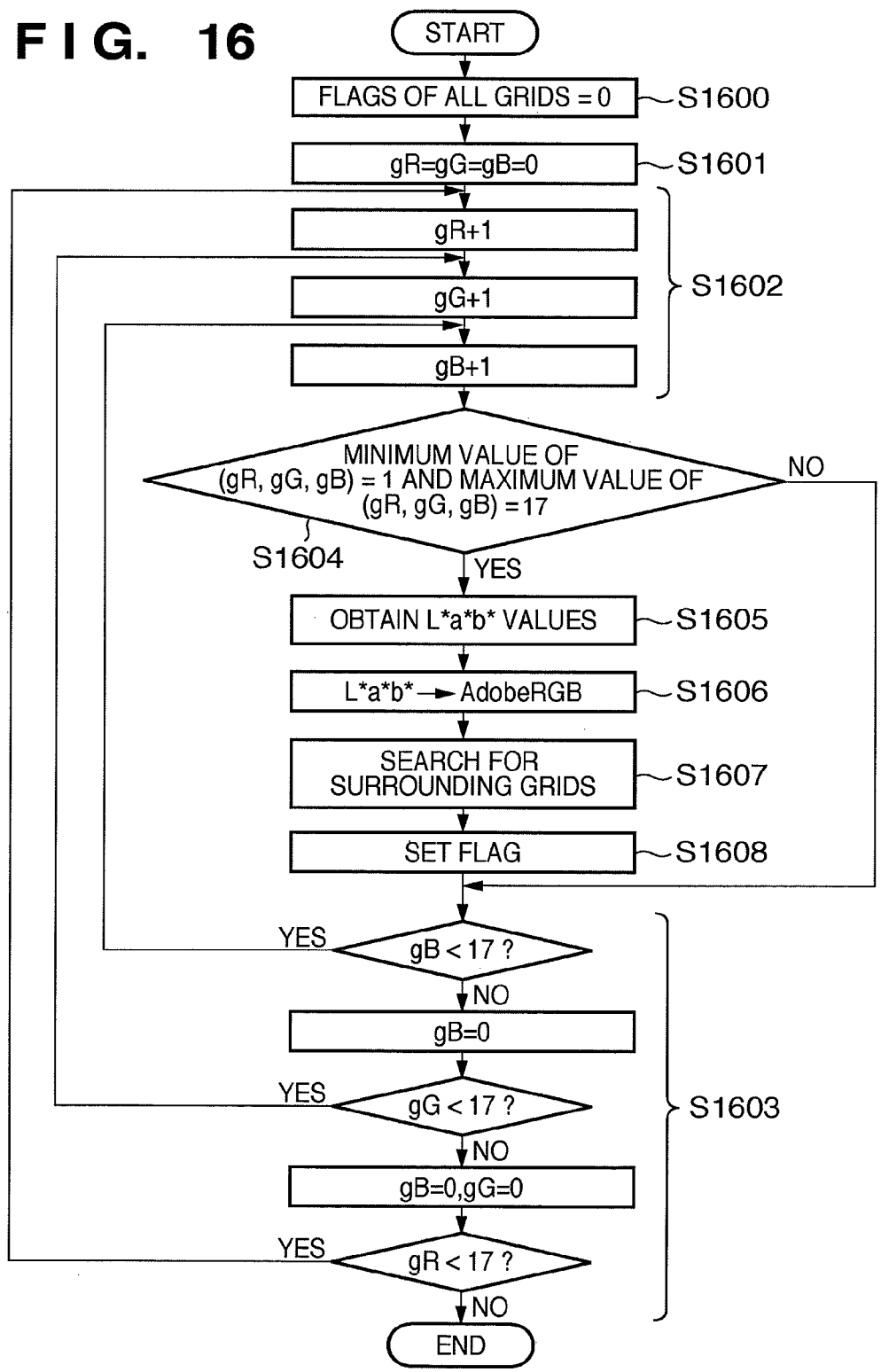
FIG. 16 is a flow chart showing a flow of processing for obtaining correction flags of 4913 lattice points.

With this in mind, a flow of processing for obtaining correction flags of 4913 lattice points is shown in FIG. 16. Prior to performing the processing of this flow chart, it is necessary to obtain, in advance, what colors are output when RGB signal values are input into the output device. For this, color patches, or the like, having RGB signal values may be printed on recording paper and colors may be measured by a measurement instrument or colors may be obtained by running a simulation. In the former case, when color is measured after recording all points of RGB signal values, the number of patches is enormous, and thus unrealistic. Therefore, a method may be used in which a reduced number of patches, for example, each channel divided into eight, which is 729 patches, are measured, and for the patches in-between, color prediction is carried out by interpolation processing.

In S1600, the flag data of all lattice points (4913 points) is initialized to zero. In S1601, the grid number is initialized to gR=gG=gB=0.

The eight blocks, that is, S1602 to S1603, show that each value of the grids (gR, gG, gB) is changed from one to seventeen and the processing is looped. Thereby, the processing of S1604 to S1608 is repeated three times for seventeen grids, or 4913 times.

In S1604, it is determined whether or not the minimum and maximum values of gR, gG and gB are one and seventeen, respectively. That is, it is determined whether or not at least one of gR, gG and gB is one, and whether or not at least one of gR, gG and gB is seventeen. When these conditions are not satisfied, no processing of S1604 to S1608 is performed and the procedure advances to S1603. When these conditions are satisfied, the RGB signal values corresponding to the present grid point represent the maximum saturation point in a hue of the output device. In other words, it can be said that the point indicates where colors are likely to be concentrated in the initial copying. When the conditions are satisfied, the procedure advances to S1605, and the colors recorded by the output device when the signal values are input are obtained. First, the grid points are converted into 8-bit signal values according to the formulas given below:

$$R=(gR-1)\times 16 \text{ (provided that when } R>255, R=255\text{)};$$

$$G=(gG-1)\times 16 \text{ (provided that when } G>255, G=255\text{)}; \text{ and}$$

$$B=(gB-1)\times 16 \text{ (provided that when } B>255, B=255\text{)}.$$

From the RGB signal values thus obtained and the color data of the output device prepared in advance as mentioned above, predicted color values are obtained. An example of an interpolation method may be the interpolation processing using a tetrahedron described with reference to FIG. 3. Thereby, predicted color values, for when predetermined RGB signal values are recorded, are obtained, and here, those values are L*a*b* values.

In S1606, the obtained L*a*b* values are converted into Adobe RGB, and at this time, the Adobe RGB values ($R_{tgt}$, $G_{tgt}$, $B_{tgt}$) of the maximum saturation point in a hue of the output device are obtained.

Next, in S1607, the lattice points of the Adobe RGB surrounding the maximum saturation point are calculated. Here, the flag data is of 4913 points in seventeen grids, that is, an 8-bit, 16-signal value interval, and therefore the lattice points R_0, G_0 and B_0 (one to seventeen) to be calculated are respectively:

$$R\_0 = R_{tgt}/16$$

$$G\_0 = G_{tgt}/16$$

$$B\_0 = B_{tgt}/16,$$

and are obtained by truncating the fractional part. Furthermore, based on the R_0, G_0 and B_0, the remaining seven points of all 8 points that surround the maximum saturation point, that is, (R_1, G_1, B_1), (R_2, G_2, B_2),
(R_3, G_3, B_3), (R_4, G_4, B_4),
(R_5, G_5, B_5), (R_6, G_6, B_6),
(R_7, G_7, B_7)

are calculated.

$$(R\_1, G\_1, B\_1) = (R\_0+1, G\_0, B\_0)$$

$$(R\_2, G\_2, B\_2) = (R\_0, G\_0+1, B\_0)$$

$$(R\_3, G\_3, B\_3) = (R\_0, G\_0, B\_0+1)$$

$$(R\_4, G\_4, B\_4) = (R\_0+1, G\_0+1, B\_0)$$

$$(R\_5, G\_5, B\_5) = (R\_0, G\_0+1, B\_0+1)$$

$$(R\_6, G\_6, B\_6) = (R\_0+1, G\_0, B\_0+1)$$

$$(R\_7, G\_7, B\_7) = (R\_0+1, G\_0+1, B\_0+1)$$

In S1608, the flags of the grids calculated in S1607 are set to 1.

A flag of either 0 or 1 is featured as an example here. However, when extensive editing processing is applied, depending on the value of the flag, there may be an excessive alteration, thereby creating overly sudden transitional portions and sometimes resulting in a phenomenon of image deterioration, such as the creation of false contours. Therefore, an intermediate portion between 0 and 1 may be generated. In this intermediate region, the signal values obtained when the aforementioned correction is carried out, that is, $R_{NEW}$, $G_{NEW}$ and $B_{NEW}$, and the signal values before editing, that is, $R_{ORG}$, $G_{ORG}$, and $B_{ORG}$, are used for conversion into $R_{NEW'}$, $G_{NEW'}$ and $B_{NEW'}$.

$$R_{NEW'} = (R_{NEW} - R_{ORG})/2.0 + R_{ORG}$$

$$G_{NEW'} = (G_{NEW} - G_{ORG})/2.0 + G_{ORG}$$

$$B_{NEW'} = (B_{NEW} - B_{ORG})/2.0 + B_{ORG}$$

That is, the extent of correction is reduced to half, and using this as a buffer region, the transition portions are smoothed.

An example of a method for obtaining flags of the buffer region may be re-searching the flags that have once been calculated as 0 or 1, and when the present flag is 0 and any of the surrounding 8 grid points has a flag value of 1, setting that region the buffer region. In this case, correction flags are 2-bit data, for example, 0 (no correction), 1 (correction) and 2 (buffer region).

FIG. 17 shows diagrams showing an outline of the editing table application processing of S103 of FIG. 1 when the correction processing of S608 in FIG. 6 is not performed (above) (i.e., when the procedure after carrying out S607 advances to S609 without performing the correction processing of S608) and when the correction processing is performed (below) (i.e., when after carrying out S607 the correction processing of S608 is performed and then the procedure advances to S609). As shown in FIG. 17, due to the editing processing of S606 of FIG. 6, the image data values are altered so that contrast is emphasized. However, saturation is decreased in many regions.

On the other hand, as shown in the lower diagram of FIG. 17, the encircled portion indicates where the correction processing is applied. As a result of the correction processing, the amount of change in lightness is decreased, and to that extent, saturation is increased.

A 3D-LUT that introduces a buffer region applies the image correction processing to image data such that in the vicinity of the border of the medium-lightness high-saturation region and other regions, the balance of saturation enhancement and contrast emphasis is arranged between the medium-lightness high-saturation region and other regions.

As described above, applying a correction to editing processing once calculated allows editing processing that suppresses image deterioration in third-generation copying to be performed. With the correction processing of this table, ordinary copying experiences no significant influence, because only the portions that greatly influence third-generation copying are corrected.

Next, a 3D-LUT for the gamut compression performed in S104 of FIG. 1 is described. FIG. 11 contains diagrams showing an outline of gamut mapping using a 3D-LUT. In the upper diagram of FIG. 11, "+" indicates a lattice point of the 3D-LUT, and the crest-shaped line shows the color gamut of the output device. As shown on the lower diagram of FIG. 11, the 3D-LUT is configured to map colors outside the color gamut of the output device to fit within the color gamut.

Figure 7:
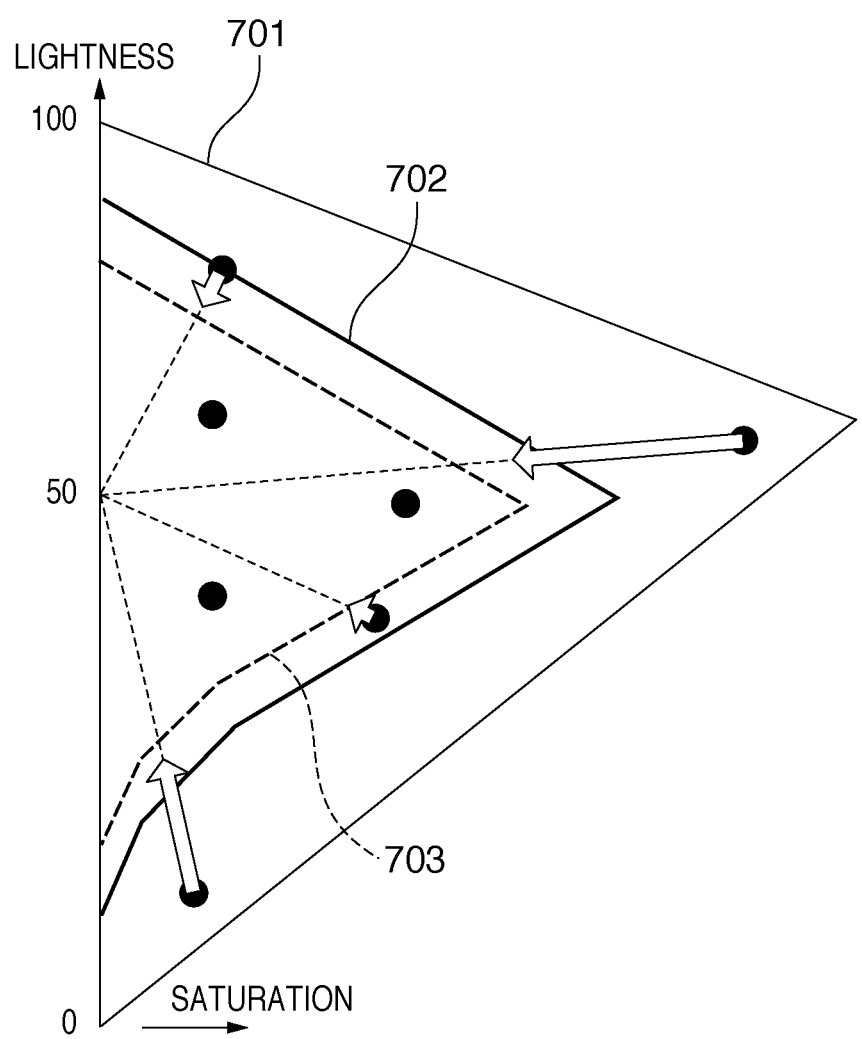
FIG. 7 is a drawing showing an outline of gamut mapping.

First, gamut mapping according to the first embodiment is described using FIG. 7. FIG. 7 is a cross-sectional drawing of a color space in a hue. In the drawing, 701 shows the color gamut of the Adobe RGB and 702 shows the color gamut of the output device. Being represented by a dotted line, 703 indicates a colorimetric matching region provided in advance. In gamut compression processing (gamut mapping), a color space that has the color gamut 701 is mapped to fit within the color gamut 702.

A color present within the colorimetric matching region 703 is mapped on an isochromatic point without compression, and a color present outside the colorimetric matching region 703 and within the color gamut 701 is compression-mapped outside the colorimetric matching region 703 and within the color gamut 702. This compression is carried out in a direction toward a lightness point, for example, L*=50, and the color is mapped any place outside the colorimetric matching region 703 and within the color gamut 702. When mapping is performed linearly, the color is determined based on how distant a pre-compression color is from the outermost point of the colorimetric matching region 703 with regard to the colorimetric matching region 703 and the color gamut 701.

When
$S_{org}$: distance between L*=50 and color before compression
$S_{col}$: distance between L*=50 and the outer border of colorimetric matching region 703 (with respect to the direction of color before compression relative to L*=50)
$S_{gam}$: distance between L*=50 and the outer border of color gamut 702 (with respect to the direction of color before compression relative to L*=50)
$S_{max}$: distance between L*=50 and the outer border of color gamut 701 (with respect to the direction of color before compression relative to L*=50),
the mapping point M is determined according to the following formula:

$$M = S_{col} + (S_{gam} - S_{col}) \times (S_{org} - S_{col})/(S_{max} - S_{col})$$

Although linear mapping is described in connection with the formula given above, there is also a method for nonlinear mapping. In this case, in order to suppress a decrease in saturation, it is effective to weight the mapping closer to the color gamut 702. In such a case, M is represented by the following formula using the coefficient g (<1):

$$M = S_{col} + (S_{gam} - S_{col}) \times \{(S_{org} - S_{col})/(S_{max} - S_{col})\}^g.$$

In other words, with respect to the color gamut of the printer, image data is mapped such that the colors of an original image and the colors of the image printed by the printer match in a region not covering near the boundary, not including zero saturation. In other regions, image data is mapped such that the image data is compressed in a predetermined scale.

Moreover, rather than using calculation, M may be obtained using a method in which a table prepared in advance is referenced.

Figure 8:
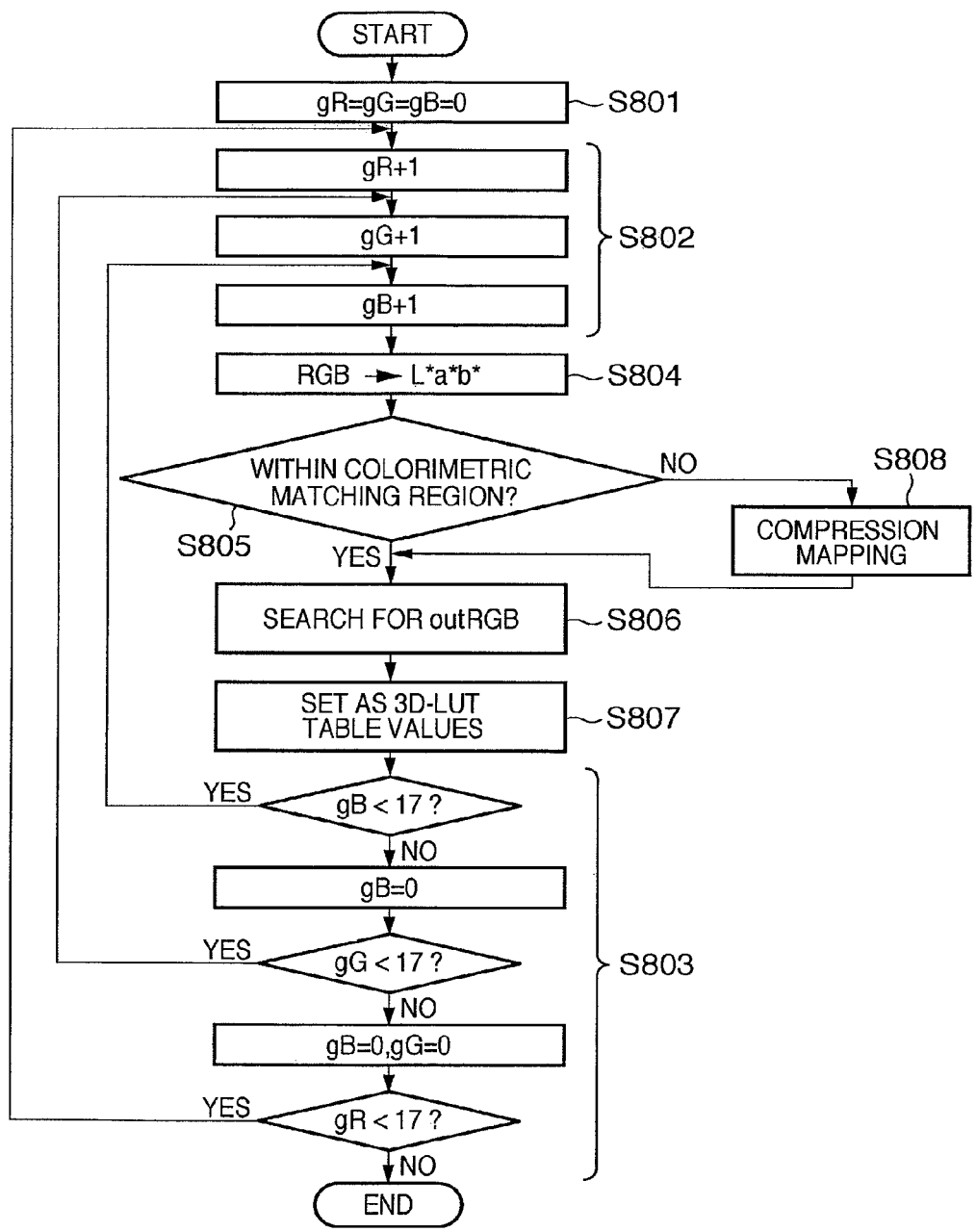
FIG. 8 is a flow chart showing a flow of processing for generating a 3D-LUT for gamut mapping.

FIG. 8 is a flow chart showing a flow of a 3D-LUT-generating process for gamut mapping. As with the 3D-LUT for S103 (editing table application processing) of FIG. 1, the 3D-LUT generated here is stored in, for example, the ROM 16 and used in a copying operation.

The processing in S801 through S804 is the same as in S601 through S604 of FIG. 6. Through these, initialization, the processing loop, and conversion of RGB values into L*a*b* values are executed.

In S805, it is determined whether the L*a*b* values obtained in S804 are within a predetermined colorimetric matching region. The determination method may be the same as the method described in connection with the editing table application processing. Here, when the values are determined as being within the colorimetric matching region, no processing is performed and the procedure advances to S806, and when the values are determined as being outside the colorimetric matching region, the procedure advances to S808 and compression mapping is performed.

In S808, the aforementioned mapping is executed, and after newly obtaining L*a*b* values, the procedure advances to S806.

In S806, data in the RGB format (outR, outG, outB) is obtained, the data being for use in printing the subject L*a*b* values by the output device. An example of a calculating method is formulating RGB data based on the relationship with the output device RGB values and the output L*a*b* values, both of which are retained in advance. At this time, as described above, if it is not possible to retain the L*a*b* values corresponding to all the RGB values (outRGB) of the output device, data of only the predetermined sample points are retained and the data of in-between points can be obtained by interpolation.

The outRGB obtained in S806 is set to be lattice point data of a 3D-LUT in S807. Thus, a 3D-LUT for gamut compression is generated.

Figure 9:
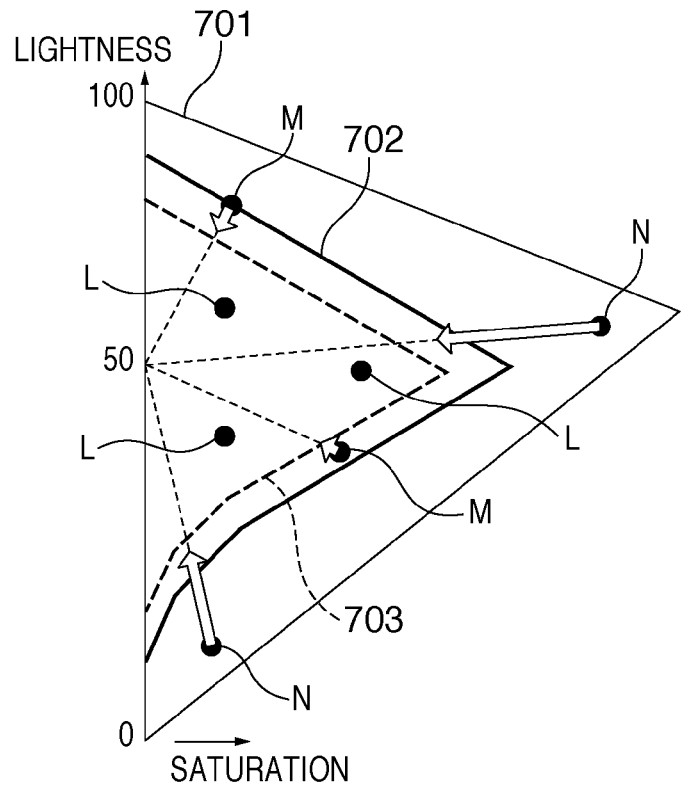
FIG. 9 is a diagram showing gamut mapping according to the first embodiment.

When the 3D-LUT generated according to the processing of this flow chart is used, compression processing as shown in FIG. 9 is performed. In FIG. 9, the same components as in FIG. 7 are given the same numbers as in FIG. 7. In the figure, the data on points L that are within the color gamut remain unmoved after mapping, and in contrast, the data on points N that are outside the color gamut are mapped to be outside the colorimetric matching region 703 and within the color gamut 702. Moreover, points such as points M that are originally located outside the colorimetric matching region 703 and within the color gamut 702 are slightly moved in the direction of the colorimetric matching region 703. The direction of the movement is the direction of a predetermined lightness (in FIG. 9, L*=50).

Figure 10:
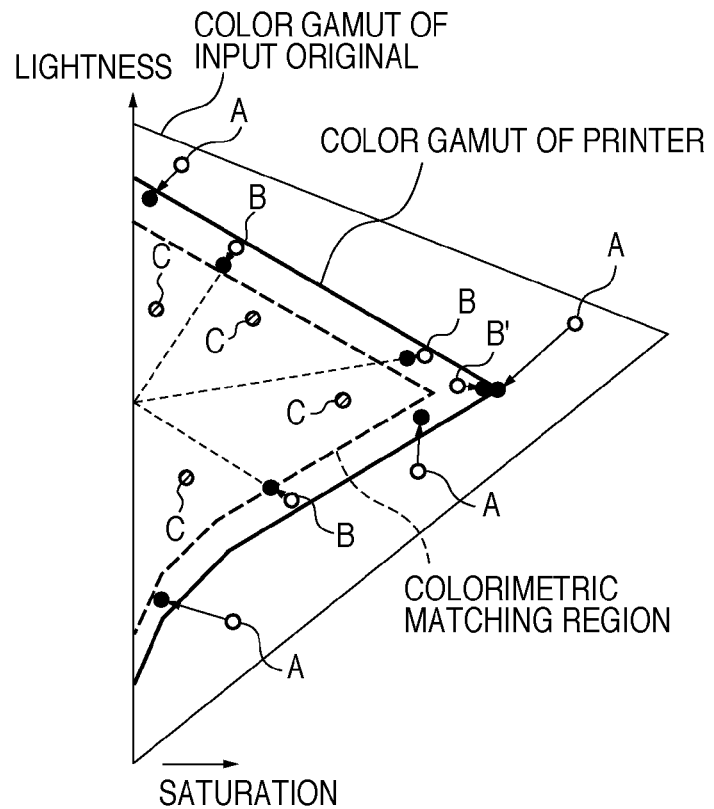
FIG. 10 is a diagram showing the color reproduction characteristics of an image copying apparatus according to the first embodiment.

Thus, when the colors of an input original are reproduced according to the color conversion processing of the present embodiment shown in FIG. 1, color reproduction characteristics as shown in FIG. 10 are obtained. The white circles in the figure indicate colors of the original, and the black circles indicate colors attained by copying according to the present embodiment. In addition, the striped circles show when input and output colors match colorimetrically. The colors at points C in the figure are colorimetrically matched, and thus, the colors of the input original are maintained colorimetrically. The colors at points A in the figure are colors that cannot be reproduced by the recording device and are compressed to be within the color gamut of the printer, and at that time, mapping is performed so as to enhance the image contrast by performing editing processing on the saturation and lightness. Points B indicate colors that can be reproduced by the recording device, but the colors are slightly compressed toward a specific lightness point. Although point B' is in a slightly-compressed region as with the points B, since B' is located near the maximum saturation of the printer, no decrease in saturation occurs.

The term "colorimetric matching" is found often in the present specification. Colors are, however, not always perfectly colorimetrically matched in practice due to measurement errors, calculation errors in interpolation, or the like, the degree of bit precision of processing, etc. It can be understood also from FIG. 17 that, despite being in the colorimetric matching region, arrows have certain lengths. Therefore, with respect to the color difference value (ΔE) shown below, colors having a value lower than a specific value are considered as colorimetrically matching:

$$\Delta E = (\Delta L^{*2} + \Delta a^{*2} + \Delta b^{*2})^{1/2}.$$

In the present specification, those that have ΔE of not more than five, which can be regarded as actually appearing to be the same color, are considered as colorimetrically matching.

Moreover, among the target colors, those that are close to yellow or blue may have extremely high or low lightness values. In addition, due to the characteristics of the recording device, there are colors for which the printing device has extremely broad or narrow color gamuts in recording. In consideration of such cases, the color reproduction method described in the present specification may be applied to specific colors only rather than being applied uniformly to all colors. In this case also, the effect of the present invention can be sufficiently obtained for those specific colors.

As described above, according to the present embodiment, the image copying apparatus 1 corrects image data obtained from the scanning device 34, as shown on the lower diagram of FIG. 17, and then performs gamut mapping.

Thereby, it is possible to provide a technique for enhancing the reproducibility of the colors of an original image in an output image for an image copying apparatus, in which the color gamut of an input device is smaller than the color gamut of an output device, while suppressing an increase of the costs of an image copying apparatus. Moreover, a color change in third-generation copying is suppressed.

Second Embodiment

In the first embodiment, attention was focused on the maximum saturation point of the recording device, and correction was performed with third-generation copying in mind. At that time, it was determined whether a correction is needed using correction flags of either zero or one. When the color gamut of the recording device is very small, colors are often concentrated on the maximum saturation point in the first copying process; therefore, although it is effective, it may not be suitable when the color gamut is large.

Accordingly, in the second embodiment, an example is given in which distribution after color reproduction is taken into consideration and correction is performed based on the distribution. The correction part in S608 of FIG. 6 is a feature of the second embodiment, and other parts such as editing, compressing, etc., are the same as in the first embodiment. Therefore, descriptions of such redundant material shall be omitted.

Figure 18:
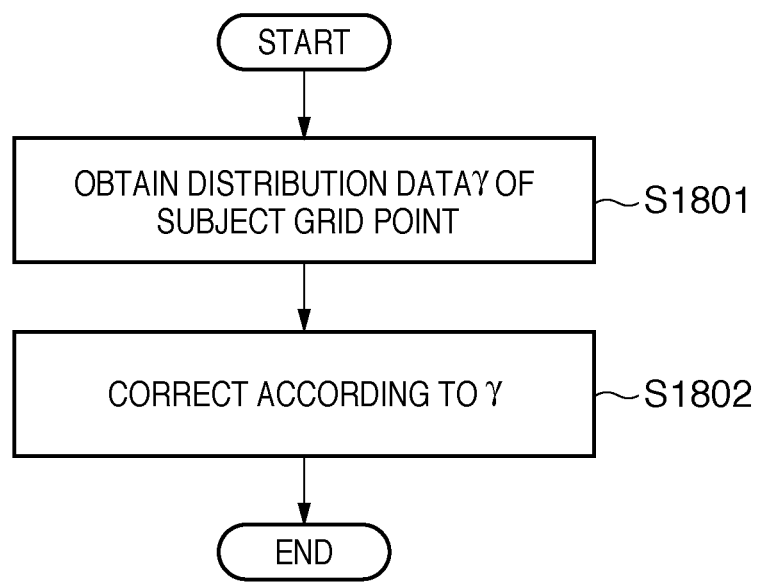
FIG. 18 is a flow chart showing a flow of correction processing according to the second embodiment.

FIG. 18 shows a flow of correction processing. Prior to starting this processing, distribution data is generated in advance. That is, data is generated to learn how colors are distributed when colors of a target color space are input and the correction of S608 in FIG. 6 is not performed, and only the editing processing of S606 is performed. For simplicity, descriptions shall be given using a two-dimensional diagram.

FIG. 15 is a mapping diagram with respect to a certain hue, and the end points, that is, the L*a*b* values of colors to be reproduced, are obtained and then converted into Adobe RGB. The values are allocated to a region that is divided in advance into small regions. For example, if a color reproduced and converted into Adobe RGB is (R1, G1, B1), and the small regions are created by dividing the Adobe RGB into sixteen, the target region ($R_{BOX}$, $G_{BOX}$, $B_{BOX}$) of this color is:

$$(R_{BOX}, G_{BOX}, B_{BOX}) = (R1/16, G1/16, B1/16).$$

This is obtained by truncating the fractional part. Moreover, each region has a counter that shows how many colors are mapped, and the counters of the target regions are incremented. This is carried out with respect to all the space data, and by dividing the counters by the total number of data items, the probability of distribution on the color space due to the editing/compression processing can be obtained. Mapping outside the color gamut of the recording device is not possible, and therefore the value is zero.

Figure 19:
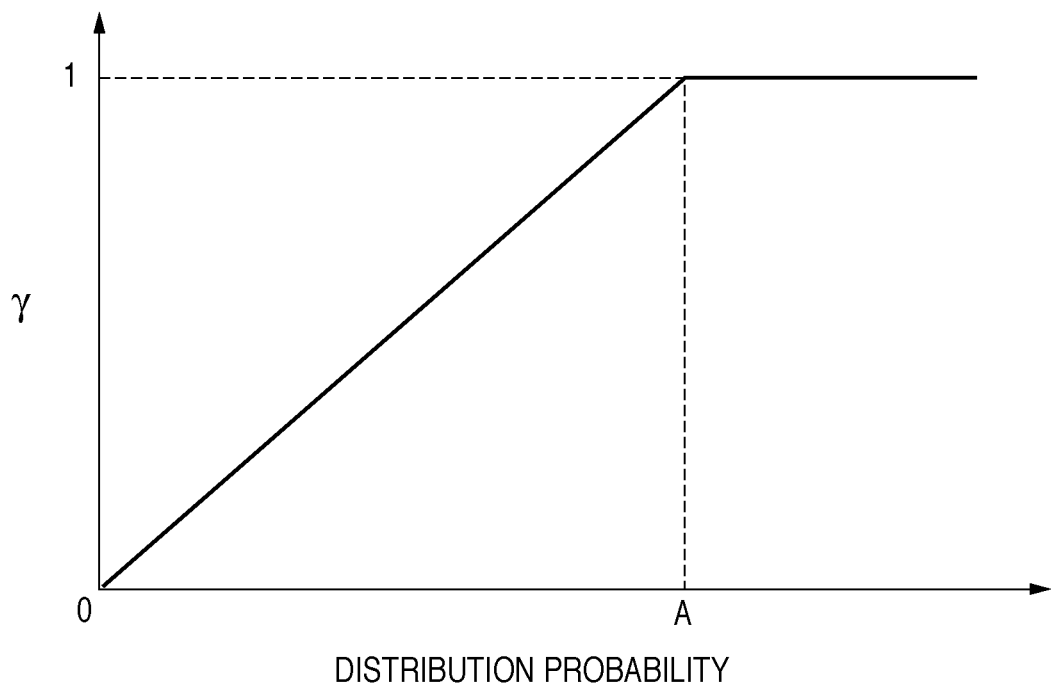
FIG. 19 is a graph for use in calculating a correction coefficient γ in the second embodiment.

Using this data, in S1801, the relevant small regions are extracted from the Adobe RGB of the target grid, and the correction coefficient γ (0-1) is obtained from the distribution probability thereof. FIG. 19 is an example of a graph for obtaining γ. When the distribution probability is not less than a specific value A, γ is 1, whereas when the distribution probability is less than A, γ decreases in a linear manner.

In S1802, using the γ obtained in S1801, the post-correction signal values ($R_{NEW}$, $G_{NEW}$, $B_{NEW}$) are obtained according to the following formulas:

$$R_{NEW} = (R_{NEW} - R_{ORG}) \times (1-\gamma) + \gamma R_{ORG}$$

$$G_{NEW} = (G_{NEW} - G_{ORG}) \times (1-\gamma) + \gamma G_{ORG}$$

$$B_{NEW} = (B_{NEW} - B_{ORG}) \times (1-\gamma) + \gamma B_{ORG}$$

Note that $R_{NEW}$, $G_{NEW}$ and $B_{NEW}$ mean the same values as in the first embodiment, and when a complete correction is performed, they indicate values corresponding to the flag value 1 in the first embodiment.

Thus, by considering a distribution possibility, more suitable correction processing can be realized for those that have some color reproducibility and do not necessarily concentrate near the maximum saturation in the first copying. As a result, for colors that are likely to be color-mapped in the first copying, suppression of image quality deterioration in which lightness is increased and saturation is decreased in the third-generation copying can be realized more accurately.

Other Embodiment

The processing described in the above embodiments may be realized by providing a storage medium, storing program codes of software realizing the above-described functions on it and providing the medium to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a Floppy® disk, a hard disk, an optical disk, a magneto-optical disk, and the like, can be used for providing the program codes. Also, a CD-ROM, a CD-R, a magnetic tape, a non-volatile memory card, a ROM, and the like, can be used.

Furthermore, the functions according to the above embodiments are realized not only by executing the program codes read by the computer. The present invention also includes a case where an OS (operating system), or the like, working on the computer performs part of or the entire processes in accordance with designations of the program codes, and realizes the functions according to the above embodiments.

Furthermore, the program codes read from the storage medium may be written in a function expansion card, which is inserted into the computer or in a memory provided in a function expansion unit, which is connected to the computer. Thereafter, a CPU, or the like, contained in the function expansion card or unit may perform part of or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-173117, filed on Jun. 29, 2007, and 2008-156999, filed on Jun. 16, 2008, which are hereby incorporated by reference herein in their entirety.

What is claimed is:

1. A table generating apparatus that generates a look-up table that associates output color data with input color data, comprising:

a processing unit that performs editing processing on lightness and saturation of the input color data which is present within a first color gamut for representing the input color data and outside a second color gamut of an output apparatus;

a detecting unit that detects a region which is present within the first color gamut and near a maximum saturation of the second color gamut of the output apparatus;

a correcting unit that corrects signal values of the input color data, which has undergone the editing processing and which is present within the region near the maximum saturation detected by said detecting unit and outside the second color gamut, so as to increase saturation of the input color data based on a difference in lightness of the input color data before and after the editing processing; and a storing unit that stores, in the look-up table, the signal values corrected by said correcting unit as the output color data.

2. The table generating apparatus according to claim 1, wherein said processing unit performs the editing processing on the lightness and saturation using a predetermined table.

3. The table generating apparatus according to claim 1, further comprising:

a determining unit that determines whether or not the input color data is within the second color gamut of the output apparatus, wherein said processing unit performs the editing processing if it is determined by said determining unit that the input color data is not within the second color gamut of the output apparatus, and said processing unit does not perform the editing processing if it is determined by said determining unit that the input color data is within the second color gamut of said output apparatus.

4. The table generating apparatus according to claim 1, wherein said correcting unit performs the correction based on a result of adding the difference in lightness before the editing processing and lightness after the editing processing to a signal value of a maximum color component before the editing processing.

5. The table generating apparatus according to claim 1, wherein said correcting unit does not perform the correction for the input color data within the second color gamut of said output apparatus.

6. A non-transitory computer-readable storage medium that stores a program to cause a computer to function as the table generating apparatus according to claim 1.

7. The table generating apparatus according to claim 1, wherein said correcting unit performs the correction for the input color data based on a calculation result derived by adding the difference in lightness of the input color data before and after the editing processing to a maximum signal value of the input color data before the editing processing.

8. A table generating method that generates, by a processor, a look-up table that associates output color data with input color data, comprising:

a processing step of performing editing processing on lightness and saturation of the input color data which is present within a first color gamut for representing the input color data and outside a second color gamut of an output apparatus;

a detecting step of detecting a region which is within the first color gamut and near a maximum saturation of the second color gamut of the output apparatus;

a correcting step of correcting signal values of the input color data, which has undergone the editing processing and which is present within the region near the maximum saturation detected in said detecting step and outside the second color gamut, so as to increase saturation of the input color data based on a difference in lightness of the input color data before and after the editing processing; and a storing step of storing, in the look-up table, the signal values corrected in said correcting step as the output color data.

9. An image processing apparatus comprising:

a color converting unit that converts input color data to output color data using a look-up table; and a compressing unit that performs gamut compression on the output color data so as to have a color gamut of an output apparatus, wherein the look-up table is generated by a method comprising:

a processing step of performing editing processing on lightness and saturation of the input color data which is present within a first color gamut for representing the input color data and outside a second color gamut of the output apparatus;

a detecting step of detecting a region which is within the first color gamut and near a maximum saturation of the second color gamut of the output apparatus;

a correcting step of correcting signal values of the input color data, which has undergone the editing processing and which is present within the detected region near the maximum saturation and outside the second color gamut, so as to increase saturation of the input color data based on a difference in lightness of the input color data before and after the editing processing; and a storing step of storing, in the look-up table, the corrected signal values as the output color data.

10. The image processing apparatus according to claim 9, wherein the editing processing edits the lightness and saturation using a predetermined table.

11. The image processing apparatus according to claim 9, wherein said processing step determines whether or not the input color data is within the second color gamut of the output apparatus, and wherein the editing processing is performed if it is determined that the input color data is not within the second color gamut of the output apparatus, and the editing processing is not performed if it is determined that the input color data is within the second color gamut of the output apparatus.

12. The image processing apparatus according to claim 9, wherein said correcting step corrects the signal values of the input color data based on a result of adding the difference in lightness before the editing processing and lightness after the editing processing to a signal value of a maximum color component before the editing processing.

13. The image processing apparatus according to claim 9, wherein said correcting step does not correct the signal values of the input color data within the second color gamut of the output apparatus.

14. A non-transitory computer-readable storage medium that stores a program to cause a computer to function as the image processing apparatus according to claim 9.

15. The image processing apparatus according to claim 9, wherein said correcting step performs the correction for the input color data based on a calculation result derived by adding the difference in lightness of the input color data before and after the editing processing to a maximum signal value of the input color data before the editing processing.

16. An image processing method performed by a processor, comprising:
- a color converting step of converting input color data to output color data using a look-up table; and
- a compressing step of performing gamut compression on the output color data so as to have a color gamut of an output apparatus, wherein the look-up table has been generated by:
- performing editing processing on lightness and saturation of input color data which is present within a first color gamut for representing the input color data and outside a second color gamut of the output apparatus;
- detecting a region which is within the first color gamut and near a maximum saturation of the second color gamut of the output apparatus;
- correcting signal values of the input color data, which has undergone the editing processing and which is present within the detected region near the maximum saturation and outside the second color gamut, so as to increase saturation of the input color data based on a difference in lightness of the input color data before and after the editing processing; and
- storing, in the look-up table, the corrected signal values as the output color data.

* * * * *